(12) United States Patent
Pazmandy et al.

(10) Patent No.: US 12,148,282 B2
(45) Date of Patent: Nov. 19, 2024

(54) ELECTRONIC SYSTEM AND METHOD FOR IMPROVING HUMAN INTERACTION AND ACTIVITIES

(71) Applicant: Logitech Europe S.A., Lausanne (CH)

(72) Inventors: Sébastien Mathieu Pazmandy, Geneva (CH); Andrea Ramirez Aburto, Vaud (CH); Gregory Franc De Ferriere, Ap Lei Chau (HK); Kevin McLintock, San Mateo, CA (US)

(73) Assignee: Logitech Europe S.A., Lausanne (CH)

( * ) Notice: Subject to any disclaimer, the term of this patent is extended or adjusted under 35 U.S.C. 154(b) by 89 days.

(21) Appl. No.: 17/870,693

(22) Filed: Jul. 21, 2022

(65) Prior Publication Data

US 2022/0358829 A1 Nov. 10, 2022

Related U.S. Application Data

(63) Continuation-in-part of application No. 17/070,873, filed on Oct. 14, 2020, now Pat. No. 11,562,639, which is a continuation of application No. 17/001,384, filed on Aug. 24, 2020, now Pat. No. 11,562,638.

(51) Int. Cl.
*G08B 21/18* (2006.01)
*G06F 3/16* (2006.01)
*G08B 5/22* (2006.01)
*G10L 25/51* (2013.01)

(52) U.S. Cl.
CPC .............. *G08B 21/182* (2013.01); *G06F 3/16* (2013.01); *G08B 5/22* (2013.01); *G10L 25/51* (2013.01)

(58) Field of Classification Search
CPC .......... G08B 21/182; G08B 5/22; G06F 3/16; G10L 25/51
USPC ........................................................ 340/540
See application file for complete search history.

(56) References Cited

U.S. PATENT DOCUMENTS

| | | | |
|---|---|---|---|
| 4,476,463 | A | 10/1984 | Ng et al. |
| 4,677,428 | A | 6/1987 | Bartholow |
| 4,705,942 | A | 11/1987 | Budrikis et al. |
| 4,785,564 | A | 11/1988 | Gurtler |

(Continued)

OTHER PUBLICATIONS

Ubidreams Beacons, <https://www.ubidreams.fr/en/beacons-2/> Mar. 4, 2020.

(Continued)

*Primary Examiner* — Naomi J Small
(74) *Attorney, Agent, or Firm* — Patterson + Sheridan, LLP

(57) ABSTRACT

Embodiments herein generally relate to an electronic system, electronic device and/or a method of using the same to improve human activities in a business, a home or an educational environment. The electronic system, electronic device, and method allows for feedback from an electronic system and/or users to alert another user that the environmental characteristic levels in a certain region are unacceptable. The method includes inputting one or more environmental characteristic preferences into one or more electronic devices, receiving, at a first electronic device of the one or more electronic devices, local environment data, determining whether the local environmental data is associated with a first user or local environment, exchanging the local environment data with the one or more electronic devices, and generating an alert.

27 Claims, 8 Drawing Sheets

(56) References Cited

U.S. PATENT DOCUMENTS

| | | |
|---|---|---|
| 4,794,634 A | 12/1988 | Torihata et al. |
| 5,117,071 A | 5/1992 | Greanias et al. |
| 5,434,617 A | 7/1995 | Bianchi |
| 5,488,204 A | 1/1996 | Mead et al. |
| 5,568,292 A | 10/1996 | Kim |
| 5,570,113 A | 10/1996 | Zetts |
| 5,610,629 A | 3/1997 | Baur |
| 5,659,332 A | 8/1997 | Ishii et al. |
| 5,677,744 A | 10/1997 | Yoneda et al. |
| 5,790,106 A | 8/1998 | Hirano et al. |
| 5,825,352 A | 10/1998 | Bisset et al. |
| 5,880,411 A | 3/1999 | Gillespie et al. |
| 5,914,708 A | 6/1999 | LaGrange et al. |
| 5,959,617 A | 9/1999 | Bird et al. |
| 6,002,387 A | 12/1999 | Ronkka et al. |
| 6,100,538 A | 8/2000 | Ogawa |
| 6,133,906 A | 10/2000 | Geaghan |
| 6,188,391 B1 | 2/2001 | Seely et al. |
| 6,323,846 B1 | 11/2001 | Westerman et al. |
| 6,392,694 B1 | 5/2002 | Bianchi |
| 6,441,362 B1 | 8/2002 | Ogawa |
| 6,504,530 B1 | 1/2003 | Wilson et al. |
| 6,529,189 B1 | 3/2003 | Colgan et al. |
| 6,597,348 B1 | 7/2003 | Yamazaki et al. |
| 6,603,867 B1 | 8/2003 | Sugino et al. |
| 6,611,281 B2 | 8/2003 | Strubbe |
| 6,667,740 B2 | 12/2003 | Ely et al. |
| 6,681,034 B1 | 1/2004 | Russo |
| 6,731,334 B1 | 5/2004 | Maeng et al. |
| 6,803,906 B1 | 10/2004 | Morrison et al. |
| 6,829,391 B2 | 12/2004 | Comaniciu et al. |
| 6,856,259 B1 | 2/2005 | Sharp |
| 7,015,894 B2 | 3/2006 | Morohoshi |
| 7,084,933 B2 | 8/2006 | Oh et al. |
| 7,098,894 B2 | 8/2006 | Yang et al. |
| 7,298,733 B2 | 11/2007 | Sakai et al. |
| 7,349,008 B2 | 3/2008 | Rui et al. |
| 7,372,455 B2 | 5/2008 | Perski et al. |
| 7,433,327 B2 | 10/2008 | Harville et al. |
| 7,567,242 B2 | 7/2009 | Perkins et al. |
| 7,612,767 B1 | 11/2009 | Griffin et al. |
| 7,649,527 B2 | 1/2010 | Cho et al. |
| 7,663,607 B2 | 2/2010 | Hotelling et al. |
| 7,688,315 B1 | 3/2010 | Gettemy et al. |
| 7,746,401 B2 | 6/2010 | Wu et al. |
| 7,855,718 B2 | 12/2010 | Westerman |
| 7,876,923 B2 | 1/2011 | Finnegan et al. |
| 7,940,432 B2 | 5/2011 | Shih et al. |
| 8,094,133 B2 | 1/2012 | Sato et al. |
| 8,094,193 B2 | 1/2012 | Peterson et al. |
| 8,122,384 B2 | 2/2012 | Partridge et al. |
| 8,130,203 B2 | 3/2012 | Westerman |
| 8,134,542 B2 | 3/2012 | Hagen et al. |
| 8,237,764 B1 | 8/2012 | Chen et al. |
| 8,243,041 B2 | 8/2012 | Westerman |
| 8,243,049 B2 | 8/2012 | Vos |
| 8,261,211 B2 | 9/2012 | Pahud et al. |
| 8,278,571 B2 | 10/2012 | Orsley |
| 8,284,254 B2 | 10/2012 | Romanowich et al. |
| 8,358,328 B2 | 1/2013 | Friel et al. |
| 8,368,752 B2 | 2/2013 | Lin et al. |
| 8,471,889 B1 | 6/2013 | Lee et al. |
| 8,547,414 B2 | 10/2013 | Sheeley |
| 8,659,638 B2 | 2/2014 | Chao et al. |
| 8,780,168 B2 | 7/2014 | Corley et al. |
| 8,842,161 B2 | 9/2014 | Feng et al. |
| 8,872,882 B2 | 10/2014 | Shanmukhadas et al. |
| 8,885,057 B2 | 11/2014 | Mock |
| 8,913,103 B1 | 12/2014 | Sargin et al. |
| 9,001,183 B2 | 4/2015 | Mauchly |
| 9,077,906 B1 | 7/2015 | Tsai et al. |
| 9,237,307 B1 | 1/2016 | Vendrow |
| 9,270,941 B1 | 2/2016 | Lavelle |
| 9,338,395 B2 | 5/2016 | Wang et al. |
| 9,955,318 B1 * | 4/2018 | Scheper .................. G06Q 10/02 |
| 2002/0106137 A1 | 8/2002 | Chen et al. |
| 2002/0175903 A1 | 11/2002 | Fahraeus et al. |
| 2004/0003409 A1 | 1/2004 | Berstis |
| 2004/0008189 A1 | 1/2004 | Clapper et al. |
| 2004/0095333 A1 | 5/2004 | Morag et al. |
| 2006/0026521 A1 | 2/2006 | Hotelling et al. |
| 2006/0250381 A1 | 11/2006 | Geaghan |
| 2007/0024706 A1 | 2/2007 | Brannon et al. |
| 2007/0030258 A1 | 2/2007 | Pittel et al. |
| 2008/0128180 A1 | 6/2008 | Perski et al. |
| 2008/0150918 A1 | 6/2008 | Hagen et al. |
| 2008/0297487 A1 | 12/2008 | Hotelling et al. |
| 2008/0309625 A1 | 12/2008 | Krah et al. |
| 2009/0174530 A1 | 7/2009 | Yen et al. |
| 2009/0262637 A1 | 10/2009 | Badaye et al. |
| 2009/0284579 A1 | 11/2009 | Knaz |
| 2010/0013796 A1 | 1/2010 | Abileah et al. |
| 2010/0020037 A1 | 1/2010 | Narita et al. |
| 2010/0051356 A1 | 3/2010 | Stern et al. |
| 2010/0252335 A1 | 10/2010 | Orsley |
| 2010/0289754 A1 | 11/2010 | Sleeman et al. |
| 2010/0315384 A1 | 12/2010 | Hargreaves et al. |
| 2011/0043489 A1 | 2/2011 | Yoshimoto et al. |
| 2011/0050843 A1 | 3/2011 | Cheng et al. |
| 2011/0099493 A1 | 4/2011 | Yu et al. |
| 2011/0116538 A1 | 5/2011 | Chuang et al. |
| 2011/0128350 A1 | 6/2011 | Oliver et al. |
| 2011/0131498 A1 | 6/2011 | Chao et al. |
| 2011/0141314 A1 | 6/2011 | Liu et al. |
| 2011/0148759 A1 | 6/2011 | Hwang et al. |
| 2011/0148792 A1 | 6/2011 | Hwang et al. |
| 2012/0019611 A1 | 1/2012 | Wu et al. |
| 2012/0068964 A1 | 3/2012 | Wright et al. |
| 2012/0158629 A1 | 6/2012 | Hinckley et al. |
| 2012/0169883 A1 | 7/2012 | Chang et al. |
| 2012/0206330 A1 | 8/2012 | Cao et al. |
| 2012/0223960 A1 | 9/2012 | Chiang et al. |
| 2012/0268626 A1 | 10/2012 | Lu et al. |
| 2012/0327041 A1 | 12/2012 | Harley et al. |
| 2012/0327042 A1 | 12/2012 | Harley et al. |
| 2013/0007499 A1 | 1/2013 | Moy |
| 2013/0183958 A1 | 7/2013 | Wesby |
| 2013/0329003 A1 | 12/2013 | Hsia et al. |
| 2013/0329863 A1 * | 12/2013 | Bentley .................. G08B 23/00 |
| | | 379/32.01 |
| 2013/0335508 A1 | 12/2013 | Mauchly |
| 2014/0043485 A1 | 2/2014 | Bateman et al. |
| 2014/0043493 A1 | 2/2014 | Bateman et al. |
| 2014/0043495 A1 | 2/2014 | Bateman et al. |
| 2014/0111600 A1 | 4/2014 | Schaefer et al. |
| 2014/0187149 A1 | 7/2014 | Lortz et al. |
| 2014/0313282 A1 | 10/2014 | Ma et al. |
| 2014/0313346 A1 | 10/2014 | Huang et al. |
| 2014/0362999 A1 * | 12/2014 | Scheper .................. G01H 3/10 |
| | | 381/56 |
| 2015/0022636 A1 | 1/2015 | Savransky |
| 2015/0109399 A1 | 4/2015 | Kuscher et al. |
| 2015/0110259 A1 | 4/2015 | Kaye et al. |
| 2015/0110278 A1 * | 4/2015 | Andersen ............. H04R 25/407 |
| | | 381/56 |
| 2015/0244853 A1 | 8/2015 | Shin et al. |
| 2016/0291861 A1 | 10/2016 | Song et al. |
| 2016/0294624 A1 | 10/2016 | Xia |
| 2017/0006162 A1 | 1/2017 | Bargetzi et al. |
| 2017/0346880 A1 | 11/2017 | Gay et al. |
| 2019/0005937 A1 * | 1/2019 | Bostick .................. H04W 4/30 |
| 2020/0072674 A1 * | 3/2020 | Baker ....................... G01J 5/60 |

OTHER PUBLICATIONS

PC Nation—AVer Embedded 10-site HD MCU with built-in 18x PTZ Video Conferencing Endpoint, webpage https://www.pcnation.com/web/details/2Y7071/Aver-Embedded-10-Site-Hd-Mcu-With-Built-In-18x-Ptz-Video-Conferencing-Endpoint-COMESE910-00848090004382. Mar. 18, 2020.

Jabra Noise Guide, https://www.jabra.com/business/office-headsets/jabra-noise-guide. Feb. 26, 2020.

(56) References Cited

OTHER PUBLICATIONS

Logitech Sync, https://www.logitech.com/en-us/video-collaboration/products/sync.html. Feb. 26, 2020.

Eileen Burbidge et al. "Google Introduces New Open Format and Developer Tools for Working with BLE Beacons", Disrupt London. https://techcrunch.com/2015/07/14/google-introduces-open-format-and-developer-tools-for-bluetooth-e-beacons/.

PatentlyApple. Apr. 13, 2014.http://www.patentlyapple.com/patently-apple/2014/04/when-it-comes-to-ibeacon-readiness-ios-7-idevices-score-87-vs-android-devices-at-a-paltry-25.html.

Wojciech Borowicz et al. "Building Apps in the Age of Beacons and Internet of Things", Mar. 11, 2015. https://uxmag.com/articles/building-apps-in-the-age-of-beacons-and-internet-of-things.

Sarah Perez. Robin, A Company Enabling Sensor-Powered Smart Offices, Raises $1.4 Million. Jul. 7, 2014. https://techcrunch.com/2014/07/07/robin-a-company-enabling-sensor-powered-smart-offices-raises-1-35-million/.

Ron Amadeo, "Meet Google's "Eddystone"—A Flexible, Open Source iBeacon Fighter". Jul. 14, 2015. http://arstechnica.com/gadgets/2015/07/meet-googles-eddystone-a-flexible- open-source-ibeacon-fighter/.

Tips for Having a Great Conference. Aver HD Video Conferencing. http://www.averusa.com/video-collaboration/support/video-conferencing-tips.asp. 1991-2015.

EVC Series. Meeting collaboration made easy and affordable. http://www.averusa.com/video-collaboration/products/evc-series-video-conferencing.asp. 1991-2015.

AVer VCLink & ScreenShare. http://www.averusa.com/video-collaboration/products/vclink-and-screenshare.asp. 1991-2015.

Portable USB Video Conference Camera System for Small and Huddle Rooms. 1991-2015.

Plug-N-Play USB Video Conference Camera System for Mid to Large Rooms. http://www.averusa.com/video-collaboration/products/vc520-usb-conference-camera.asp. 1991-2015.

Ubidreams Beacons, <https://www.ubidreams.fr/en/beacons-2/>.

How to Cut to Different Shots. https://help.getmevo.com/hc/en-us/articles/223725908-How-to-Cut-to-Different-Shots. Sep. 27, 2016.

Enable Face Detection. https://help.getmevo.com/hc/en-us/articles/224041827-Enable-Face-Detection. Sep. 27, 2016.

Edit on the fly. https://getmevo.com/mevoapp. Downloaded Dec. 12, 2016.

So many ways to share. https://getmevo.com/sharing. Downloaded Dec. 12, 2016.

PC Nation—AVer Embedded 10-site Hd Mcu with built-in 18x PTZ Video Conferencing Endpoint, webpage https://www.pcnation.com/web/details/2Y7071/Aver-Embedded-10-Site-Hd-Mcu-With-Built-In-18x-Ptz-Video-Conferencing-Endpoint-COMESE910-00848090004382.

Haines, 5 Things You Need To Know About Beacon Technology, https://www.wordstream.com/blog/ws/2018/10/04/beacon-technology, published Oct. 4, 2018.

German Examination Report dated Apr. 28, 2020, for German Application No. 102017108589.0.

Jabra Noise Guide, https://www.jabra.com/business/office-headsets/jabra-noise-guide.

Logitech Sync, https://www.logitech.com/en-us/video-collaboration/products/sync.html.

* cited by examiner

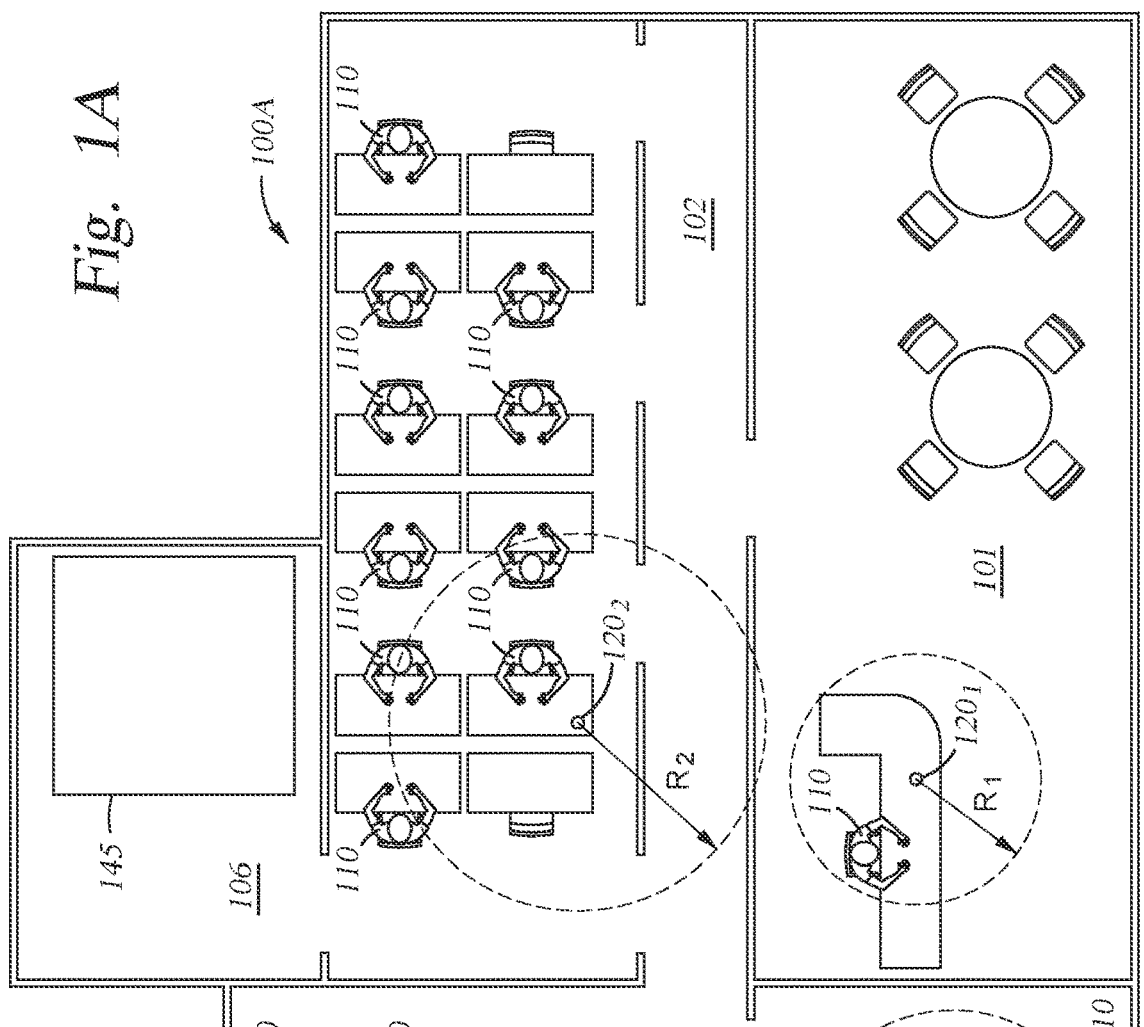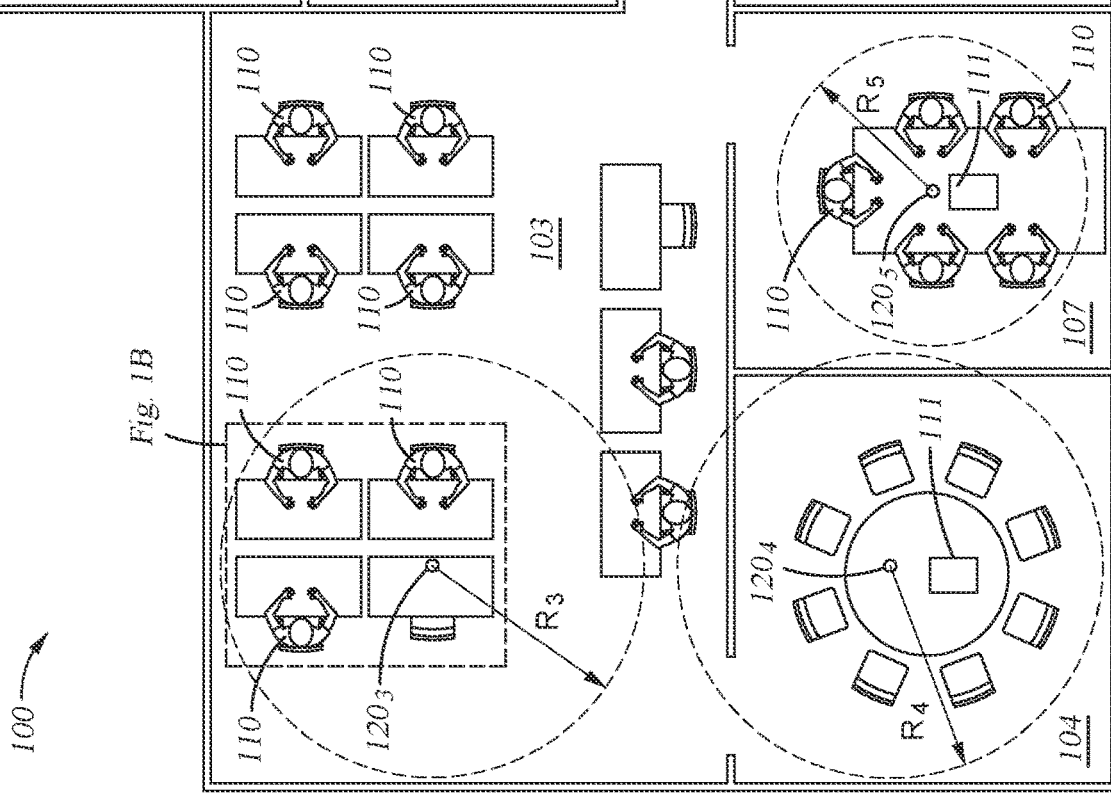

ELECTRONIC SYSTEM AND METHOD FOR IMPROVING HUMAN INTERACTION AND ACTIVITIES

CROSS REFERENCE TO RELATED APPLICATIONS

This application is a continuation-in-part of U.S. patent application Ser. No. 17/070,873, filed Oct. 14, 2020, which is a continuation of patent application Ser. No. 17/001,384, filed Aug. 24, 2020, which are both hereby incorporated herein by reference.

BACKGROUND OF THE INVENTION

Field of the Invention

Embodiments disclosed herein generally relate to an apparatus and a method of monitoring and providing feedback to adjust and improve human interaction and activities, and, more specifically, to an electronic system, electronic device and/or a method of using the same to improve human activities in a business, a home or an educational environment.

Description of the Related Art

Open office spaces have become a popular way to structure work environments. In open offices, the number of offices and cubicles are reduced, such that employees work in an open environment with less walls or other barriers between the employees. An open environment increases communication between employees and managers, encouraging more collaboration. In addition, open environments reduce costs by reducing the overall footprint needed in a given office. Personal office spaces or areas can be converted to common areas, which can reduce a business's overhead costs.

Open office environments, however, increase office noise, due to the lack of physical barriers between different office workers. Therefore, many open office environments include areas that are specifically suited and/or configured for the generation of higher sound levels, such as sound levels achieved during meetings and phone calls. Open office environments may also include quieter areas, so that workers who desire a quieter environment, can work more effectively. In addition, open office environments can also include conference rooms for cases where privacy is required.

One drawback of conventional open environments is that a non-confrontational, systematic and comprehensive method of providing feedback to users who do not maintain appropriate sound levels does not currently exist. In addition, there are no solutions for helping users automatically find open conference rooms so that the user can continue their phone or voice call without being interrupted. Also, there is no way to automatically create, identify and/or move individuals to quiet or noisy areas within a specific region of an office, educational space, library or home.

Moreover, it has been found that productivity of individuals working in an office environment or similar shared area can be greatly affected by one or more environmental factors or environmental characteristics, which can include sound level, as discussed above. Office environments or similar shared areas may also include areas that have undesirable levels of one or more of these environmental factors which can negatively affect a person's ability to perform a duty or task efficiently.

Therefore, there is a need in the art for systems to provide feedback to a user and/or find ways to manage the various environmental factors within an office, educational space, library or home environment. There is also a need for a system, device(s) and methods that solves the problems described above.

SUMMARY OF THE INVENTION

Embodiments herein generally relate to an electronic system and a method of transmitting improving human interaction and activities. The electronic system and method allow for anonymous feedback to a user regarding the characteristics of a detected environmental characteristic that has achieved an undesirable level within a region of an environment.

In one embodiment, a computer implemented method is provided, including receiving, at a first electronic device, an environmental characteristic preference level from one or more electronic devices, receiving, at the first electronic device, local environment data, wherein the local environment data comprises an environmental characteristic, determining that the local environmental data is associated with a region of a local environment, generating an alert on the first electronic device, wherein the generated alert is generated after determining that the environmental characteristic exceeds the received environmental characteristic preference level, and displaying information on a display of the first electronic device, wherein the displayed information comprises information relating to the generated alert.

In another embodiment, a computer implemented method is provided, including inputting into a first electronic device a first environmental characteristic preference level, receiving, at the first electronic device, a second environmental characteristic preference level from a second electronic device, receiving, at the first electronic device, local environment data, determining that the local environmental data is associated with a first user, and generating an alert on the first electronic device, wherein the generated alert is generated after determining that a characteristic of the local environmental data exceeds the received second environmental characteristic preference level.

In yet another embodiment, an electronic system is provided, including a first electronic device including an environmental sensor, and a non-volatile memory having program information stored therein, wherein the program information includes a number of instructions which, when executed by a processor, causes the first electronic device to perform operations including receiving, at the first electronic device, local environment data from the environmental sensor, determining whether the local environmental data is associated with a first user, exchanging the local environment data with the first electronic device, generating an alert on the first electronic device, wherein the generated alert is generated after determining that a characteristic of the local environmental data exceeds the received environmental characteristic preference level, and displaying information on a display of the first electronic device, wherein the displayed information comprises information relating to the generated alert.

In yet another embodiment, a computer implemented method is disclosed that includes: receiving, at a first electronic device, local environment data, wherein the local environment data comprises information regarding an environmental characteristic level of a local environmental characteristic level detected in a first region of an environment; determining that the environmental characteristic level is greater than a first environmental characteristic preference level; receiving, at the first electronic device, availability information, wherein the availability information is derived from determining that an environmental characteristic level detected in a second region of the environment is less than a second environmental characteristic preference level; generating an alert by the first electronic device, wherein the alert is generated after it is determined that the environmental characteristic level is greater than the first environmental characteristic preference level and after receiving the availability information; and then displaying the availability information and information relating to the alert on a display associated with the first electronic device.

In yet another embodiment, a computer implemented method is disclosed that includes: receiving, at a first electronic device, local environment data, wherein the local environment data comprises information regarding a environmental characteristic level detected in a first region of an environment; determining that the environmental characteristic level is greater than or less than a first environmental characteristic preference level; receiving, at the first electronic device, availability information, wherein the availability information comprises information regarding an availability of a second region of the environment; generating an alert on the first electronic device, wherein the alert is generated after it is determined that the environmental characteristic level is greater than or less than the first environmental characteristic preference level and after receiving the availability information; and then displaying the availability information and information relating to the alert on a display associated with the first electronic device.

In yet another embodiment, a computer implemented method is disclosed that includes: receiving, at a first electronic device, local environment data, wherein the local environment data comprises information regarding an environmental characteristic detected in a first region of an environment; determining that a level of the environmental characteristic is greater than or less than a first environmental characteristic preference level; receiving, at the first electronic device, availability information, wherein the availability information comprises information regarding an availability of a second region of the environment; and displaying the availability information on a display of the first electronic device after determining that the environmental characteristic is greater than or less than the first environmental characteristic preference level. In some embodiments, the environmental characteristic is an environmental characteristic that does not include sound level.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1A illustrates a schematic top view of an environment in which humans can interact, according to one embodiment.

Figure 1B:
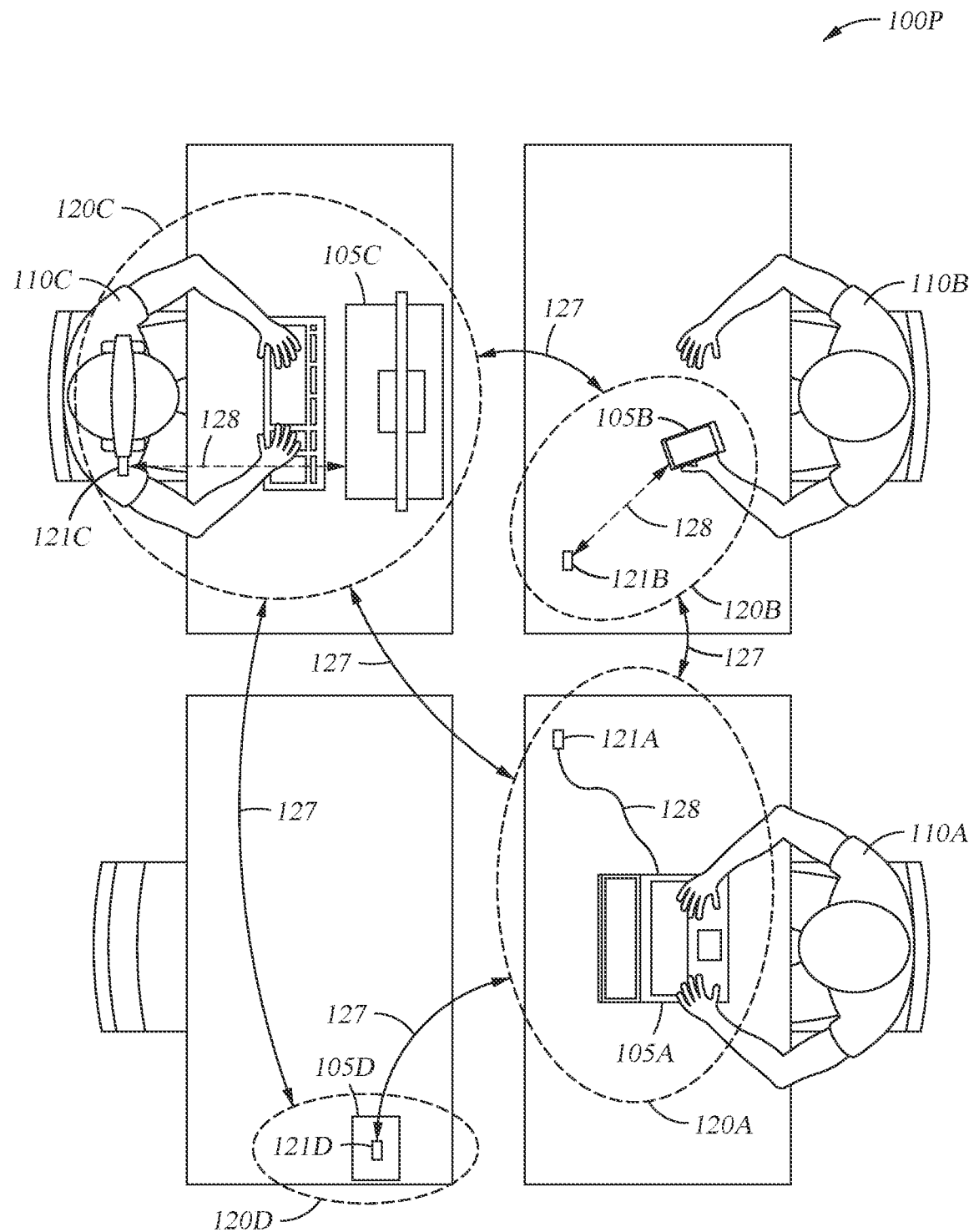
FIG. 1B illustrates a schematic diagram of a portion of an environment in which humans can interact, according to one embodiment.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Embodiments herein generally relate to an electronic system and a method of monitoring and providing feedback to adjust and improve human interaction, human productivity and facilitate human activities. Embodiments of the disclosure can provide an electronic system and method that allows a user to receive real time feedback based on one or more environmental characteristics within a local environment in which the user is positioned. Embodiments of the disclosure can also provide an electronic system and method that allows a user to receive real time feedback based on the sound levels the user is generating. As discussed herein, sound level can be one of the environmental characteristics that is analyzed. Sound level, which may be referred to as a loudness level, is measured in decibels (dBs). In some embodiments, the sound level in an environment can be determined by finding and or characterized by a root-mean-square (RMS) value of an audible signal.

In some configurations, the feedback provided to a user regarding one or more of the environmental characteristics can be provided anonymously. For example, the feedback can be related to unacceptable sound levels being generated by a user. The method includes inputting one or more sound preferences into one or more electronic devices, receiving, at a first electronic device of the one or more electronic devices, local environment data, determining whether the local environmental data is associated with a first user, exchanging the local environment data with the one or more electronic devices, and generating an alert on the first electronic device. An electronic system is provided to perform one or more of the methods disclosed herein.

The methods disclosed herein describe one or more processes for monitoring and analyzing the environmental characteristics in an environment, such as an office, educational facility or home. The method and electronic system disclosed herein allow users in an environment to provide anonymous feedback to users or host. In some cases, users in an environment can provide anonymous feedback to a user that is causing a distraction, such as the user not maintaining an appropriate sound level. The method and electronic system may also provide solutions to users to move either to an area with more appropriate levels of an environmental characteristic and/or to reserve a space that is better suited for a user, such as an unused conference room or a place that does not have the undesirable environmental characteristic. The method and electronic systems disclosed herein allow for monitoring and creating areas within an office or similar space that have differing environmental characteristics, such as loud and quiet regions for more effective location of individuals within an office or other type of space. Embodiments described herein can be useful for, but are not limited to, methods and electronic systems used for comparing levels of an environmental characteristic in an open workspace, confined room, home or educational environment.

FIG. 1A illustrates a schematic top view of an environment 100 in which humans can interact, according to one embodiment. The environment 100 can be an open office, confined room, home, or educational environment. For the purpose of explanation of various embodiments of the disclosure, the environment 100 can include a plurality of rooms 100A that may include one or more of a reception room 101, a first employee work room 102, a second employee work room 103, a first conference room 104, a second conference room 107, and a host device room 106. Although the environment 100 as shown include the six previously mentioned rooms 101, 102, 103, 104, 106, 107, it is to be understood that the number of rooms is purely illustrative, and any number of rooms and types of rooms could be contained within the environment 100.

Each room of the plurality of rooms 100A generally has one or more users 110 included there within, although at any given time one or more rooms 100A can be empty. In addition, the number of users 110 in a given room 100A can fluctuate over time.

Figure 5:
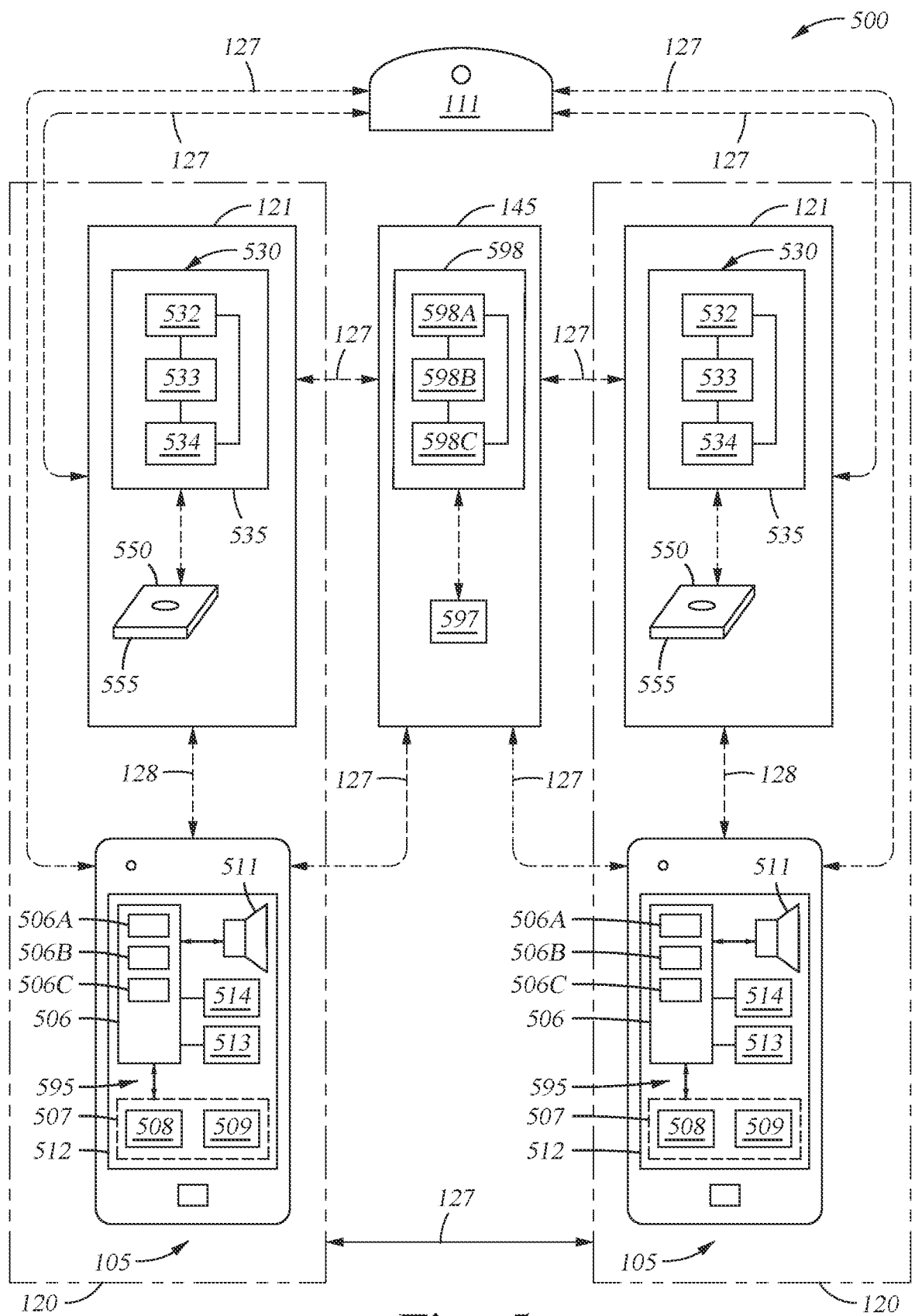
FIG. 5 illustrates a schematic diagram of an electronic system, according to one embodiment.

Each of the rooms 100A can include one or more electronic devices 120 (e.g., electronic device 120A, 120B, 120C, 120D, 120E respectively) that are part of an electronic system 500 (FIGS. 1B and 5). The one or more electronic devices 120 may include devices positioned in a room 100A (e.g., the electronic device is mounted on a wall of the room, on a table in the room, etc.) and/or associated with one of the users 110 of the room 100A.

The plurality of rooms 100A optionally includes a host device room 106, and a host device 145 of the electronic system 500 that is located therein. The host device 145 can facilitate communication between various devices (e.g., electronic devices 120) disposed in the environment 100. The host device 145 is described in more detail below. In some embodiments, the host device 145 is located offsite, and the host device room 106 is not included.

FIG. 1B is a schematic diagram of a portion 100P of the environment 100, according to one embodiment. As shown, a plurality of users 110 are positioned within the portion 100P of the environment 100, such as a room or portion of a room. In this example, each user 110 (e.g., users 110A, 110B, 110C) is associated with an electronic device 120 (e.g., electronic devices 120A, 120B, 120C).

The electronic devices 120 can be configured to monitor and process characteristics of one or more environmental characteristics found within the environment 100. The electronic devices 120 can be any type of electronic device, such as a cell phone (e.g., smart phone), a tablet computing device, laptop computer, an e-book reader, a portable music player, a dedicated sensor, an environmental monitoring device with multiple sensors, or other similar electronic device. Examples of an electronic device 120 include, but are not limited to, iPod® media player, iPhone® smart phone, iPad® tablet, Android™ phone, Samsung phone, Samsung Galaxy® smart phone, Squeeze™ box, Microsoft Surface® tablet, laptop, video camera, wall mounted sensor, or other similar device. In some embodiments, the electronic device 120 is part of the conferencing device 111. The conferencing device 111 can be any electronic device used in the art for short or long-distance digital communication, such as a telephone, video phone, television, and the like.

As shown, an electronic device 120 includes a processing device 105 and a communication device 121. In one embodiment, the electronic device 120 is a single integrated device, such that the processing device 105 and the communication device 121 are integrated in a single unit (e.g., a computer or a cell phone). In other embodiments, the communication device 121 is an external device that is in communication with the processing device 105, where the processing device 105 is a personal electronic device, such as a laptop, smart watch or smart phone. The communication device 121 can include an electronic device (e.g., controller 530) that essentially includes an input/output (I/O) device 532 that includes one or more sensors, such as at least one of a microphone, temperature sensor (e.g., thermocouple, RTD), gas analyzing sensor (e.g., oxygen level detector, $CO_2$ level detector), light intensity level detector (e.g., photoelectric device), air movement sensor (e.g., velometer), humidity sensor, air pressure sensor, vibration level sensor (e.g., accelerometer), camera or other useful sensor. As is discussed further below, in some other embodiments, the communication device 121 includes a controller 530 that includes a processor 534, memory 533 and an I/O device 532 that includes the an environmental characteristic measurement sensor, such as a microphone, camera, temperature sensor, photodetector and/or $CO_2$ level detector.

The communication device 121 is configured to receive and transmit the local environment data received from the environment 100 to the processing device 105 via the communication link 128. The communication link 128 can be a wired or wireless communication link. The processing device 105 is configured to receive and process the local environment data transmitted from the communication device 121. The electronic device 120 will be referred to herein as a single integrated device, but it is to be understood that the electronic device 120 can be a combination of a separate processing device 105 and communication device 121, without loss of generality.

In one example shown in FIG. 1B, the processing device 105A is a laptop, and the communication device 121A includes a microphone that is configured to communicate with the laptop by a universal serial bus (USB) cord, which forms at least part of the communications link 128. In another example, the processing device 105B is a smart phone, and the communication device 121B includes a microphone that communicates to the smart phone by a Bluetooth® communications link 128. In yet another example, the processing device 105C is a desktop computer, the electronic device 121C is disposed on a headset, and the electronic device 121C communicates with the processing device 105A by a Bluetooth® or a WiFi communications link 128. In an additional example, the electronic device 120D is fixed to a desk, and the electronic device monitors the sound levels of the room or area nearby, rather than the sound levels of a particular user. In another example, a first electronic device 120A includes a laptop 105A that is connected to a microphone within a communication device 121A via a USB connection, a second electronic device 120B includes a tablet 105B that is wirelessly connected to a microphone within a wireless communication device 121B, a third electronic device 120C includes a video conferencing device 105C that is wirelessly connected to a microphone within a gaming headset (i.e., communication device 121C), and a fourth electronic device 120D includes a conference phone 105D that includes a communication device 121D that includes a microphone.

In another example, the processing device 105A is a laptop, and the communication device 121A includes a base station that includes one or more of the environmental characteristic sensors that are configured to communicate with the laptop via the communications link 128. In another example, the processing device 105B is a smart phone, and the communication device 121B includes an environmental characteristic sensor that communicates to the smart phone by a Bluetooth® communications link 128. In yet another example, the processing device 105C is a desktop computer, the environmental characteristic sensor containing electronic device 121C is disposed on a headset, and the electronic device 121C communicates with the processing device 105A by a Bluetooth® or a WiFi communications link 128. In another example, the processing device 105B is a smart phone, desktop computer, laptop computer or other similar device, and the communication device 121B includes an environmental characteristic sensor that communicates to the smart phone, desktop computer or laptop computer by a LoRa® type of communications link 128 that is formed within a low-power, wide area network (LoRaWAN®).

Referring back to FIG. 1A, each of the plurality of electronic devices 120 is configured to monitor an environmental characteristic within the room 100A in which the electronic device is contained within (e.g., the electronic device 120₁ monitors the sound level of the reception room 101). Each electronic device 120 has an associated intended sphere of interaction radius R (hereafter radius R), and the electronic device is configured to primarily detect and monitor local environment data within the radius R (e.g., the electronic device 120₁ has a radius $R_1$, and the electronic device 120₁ is configured to monitor local environment data from sources within the radius $R_1$). In some embodiments, the electronic device 120 is positioned to detect sound within a local region of the environment defined by the radius R. In some embodiments, the electronic device 120 is positioned to detect air quality metrics such as the air temperature within a local region of the environment defined by the radius R. The radius R can be changed by selecting and/or adjusting the sensitivity of the communication device 121 (e.g., microphone, $CO_2$ detection level) and/or signal processing techniques (e.g., signal-to-noise cancellation, loudness detection, signal drift cancelling techniques) by use of hardware and/or software contained within the electronic device 120. In some examples, the radius R may be selected to primarily detect environmental data that is within a radius of about 1 meter (m), 2 m, 3 m, 5 m, 8 m, 10 m, 15 m or 25 m in size. In one example, the electronic device 120 is configured to primarily detect environmental data that has a loudness (SPL) greater than 50 dB, such as between 60 and 100 dB, within a radius R that is about 1 m to about 10 m in size, such as about 2 m to about 5 m in size. In another example, the electronic device 120 includes one or more sensors that are configured to detect an environmental characteristic and generate environmental data that includes at least one of an occupancy level, an air temperature that is within a range between 16° C. (60° F.) and 35° C. (95° F.), a gas concentration level (e.g., $CO_2$ level) and light intensity level within a radius R that is about 1 m to about 10 m in size, such as about 2 m to about 5 m in size. In some embodiments, the radius R is preconfigured by setting hardware and software parameters that are determined by the application of a qualification process that may include testing and modification of the software and hardware parameters. The qualification process may include, for example, the use of one or more sound generating devices that are positioned at a desired distance and generate a desired sound at a desired loudness and frequency in an at least a partially controlled or process variable monitored environment (e.g., air temperature, humidity, barometric pressure, etc.). In some embodiments, the radius R is set by use of machine learning (ML) or artificial intelligence (AI) software loaded into memory of electronic device 120, and thus be able to set and/or adjust the radius R based on program instructions stored in memory, input received from one or more users or other electronic devices positioned at a known distance from the electronic device 120, and/or by the use of a qualification process.

In general, and as discussed herein, the local environment data can include one or more different types of environmental characteristics of a local environment, such as, but not limited to, environmental data that includes sound level data, occupancy level data, temperature level data, gas composition level data (e.g., $O_2$ level, $CO_2$ level, nitrogen ($N_2$) level), light intensity level data, humidity level, air velocity level data, air pressure level data, or vibration level data. As is discussed herein, the local environment data can, for example, include environmental characteristic containing data that includes an audible signal that includes audible sounds created by one of the users 110. The audible sounds created by a user can include sounds generated by the user themselves, such as sounds created by talking, clapping, whistling, or humming, or sounds generated by another device or instrument that are under the user's control, such as a sound level being generated by an audio speaker, headphones or other sound generating device.

In some embodiments, the electronic device 120 is configured to distinguish the number of people present in the room 100A, or occupancy level, in which the electronic device is contained within. This allows a user 110 to know if a room is occupied, or if there is room for the user 110 in the room (i.e., if the room is at capacity). In some embodiments, the electronic device 120 is configured to identify and distinguish the different voices and identify the users 110 by their voices. In addition, the electronic device 120 can identify other users 110 by identifying the other electronic devices 120 present in the room 100A. The identification of a specific user 110 can be broadcast to some or all of the other users 110 on a continuing or intermittent basis. This allows a user (e.g., user 110A) to locate another user (e.g., user 110B).

If a room is sized and/or shaped such that one electronic device 120 is unable to adequately monitor local environment data of the entire room, multiple electronic devices 120 can be included in a single room. The interaction radii R of the multiple electronic devices 120 can be configured such that local environment data in the entire room is monitored. The room includes three or more electronic devices 120, and thus the electronic devices are able to triangulate sources, such as sound sources, or vibration sources, according to one embodiment.

One of the electronic devices 120 is typically configured to communicate with other electronic devices 120 located in the environment 100 via the one or more communication links 127 (e.g., the electronic device 120A communicates with the electronic devices 120B, 120C). The communication link 127, and also communication link 128, can each include a wired and/or wireless communication path that is enabled by the transmission of a communication signal, such as the transmission of a radio signal, infrared signal, ultrasonic signal, electronic signal, or other similar communication signal transfer method, according to some embodiments. Other communication signal transfer methods that can be used include, but are not limited to, wireless communication technologies, such as Bluetooth® wireless technology (BT), Bluetooth® Low Energy wireless technology (BLTE), Infrastructure Wireless Fidelity (Wi-Fi™) wireless technology, soft access point (AP), Wi-Fi-Direct, near-field communication (NFC), and any combination of the above. As is discussed further below, the electronic devices 120 will also generally include software applications that include software algorithms that are stored in memory and are configured to receive, analyze and/or transmit the information transferred via a communication link 127. The software algorithms are generally used by one or more of the electronic devices 120 to perform some part of the various methods described herein.

In general, users 110 may desire to work in a working environment that has sound levels below a given volume. For example, the user 110B of FIG. 1B desires to work in a quiet area such that sound levels are kept below about a quiet limit, such as about 55 dB. If the other user 110A is speaking at a volume greater than the quiet limit, the user 110B will find it more difficult to concentrate. The user 110B can find it difficult to alert the user 110A about the sound preferences to the user 110B. For example, the user 110B does not want to annoy or humiliate the user 110A, or, for example, intervene on a call or conference call that the user is attending at that moment in time. Therefore, it can be desirable for the user 110B to supply his or her preferences anonymously. Likewise, it is desirable for the user 110A to become aware that they are speaking at a level that is too high for the other users 110 in the same portion 100P or an adjacent portion of the environment 100.

For these reasons, in a given environment 100, it is desirable that certain work spaces and/or rooms maintain a sound level below a certain amount. For example, certain rooms or work spaces can be designated as quiet areas, such that sound levels are kept below about a quiet limit, such as about 55 dB. In other cases, a higher sound level in the area is acceptable. For example, certain rooms or work spaces can be designated as collaboration areas, such that sound levels are kept below a collaboration limit, such about 70 dB. Loud areas can be used when collaboration is needed, such as work rooms or conference rooms. Therefore, it is desirable to alert the user 110A that, while his or her speaking voice is too loud for a given area and/or the surrounding users 110, another loud area is available for the user 110A to move to. Although loud and quiet areas or zones are disclosed herein, it is to be understood that these are examples, and any number of different zones with different sound levels can be applied.

Figure 2:
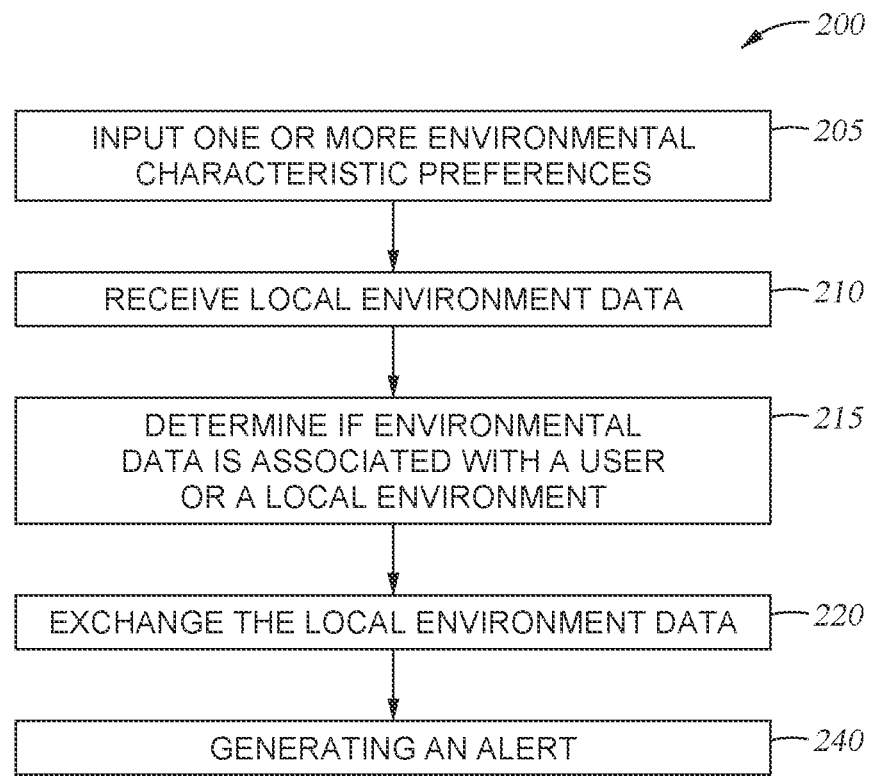
FIG. 2 is a flow diagram of a method for providing feedback and/or managing the interaction of one or more users within an environment, according to one embodiment.

FIG. 2 is a flow diagram of a method 200 for providing feedback and/or managing the one or more users 110 within the environment 100, according to one embodiment. Although the method 200 operations are described in conjunction with FIGS. 1A-5, persons skilled in the art will understand that any system configured to perform the method operations, in any order, falls within the scope of the embodiments described herein.

The method 200 begins at operation 205, where one or more of the users 110 input one or more environmental characteristic preference levels into their respective electronic device 120. For example, the user 110B enters a public sound characteristic preference level of 55 dB into the electronic device 120B. In some embodiments, the respective electronic device 120B then stores the public sound characteristic preference level and/or transmits the public sound characteristic preference level to the other electronic devices 120A, 120C, 120D by use of the one or more communication links 127. Thus, the other users 110A, 110C, by use of software running on their respective electronic devices 120A, 120C, can view or receive confirmation of the public sound characteristic tolerance level of the user 110A. In some embodiments, the user 110B also inputs a private sound characteristic tolerance level, which is described in more detail below. In some embodiments, the host device 145 first receives the public sound characteristic preference level, and the host device 145 then stores the public sound characteristic preference level and transmits the public sound characteristic preference level to all of the available electronic devices, such as electronic devices 120A, 120C, 120D. In another example, the user 110B provides input that a maximum carbon dioxide ($CO_2$) level in the environment surrounding them is desired to be less than 2000 ppm, such as less than 1000 ppm, or even less than about 800 ppm into the electronic device 120B. In another example, the user 110B provides input that a maximum temperature level in the environment surrounding them is desired to be less than 27° C. (80° F.), such as less than 24° C. (75° F.), or between about 18° C. (65° F.) and about 24° C. (75° F.) into the electronic device 120B. In another example, the user 110B provides input that a preferred light intensity level in the environment surrounding them is desired to be between about 250 lumens-per-square-meter (lux) and 1500 lux, such as 500 lux into the electronic device 120B.

At operation 210, one or more of the electronic devices 120 receive local environment data. The local environment data includes one or more measurable environmental characteristics, such an audible signal level, occupancy level, an environmental temperature level, a desired $CO_2$ level, or office space lighting level within the surrounding environment 100. For example, the audible signal includes the detected sound levels generated by the first user 110A, which is associated with the first electronic device 120A. The process of receiving the local environmental data will include the use of a microphone that is part of and/or in communication with the electronic device 120, as discussed further below. In one example, as illustrated in FIG. 1B, a microphone within the communications device 121A of the electronic device 120A is used to monitor and detect the audible signal generated by the first user 110A. The audible signal generated by the first user 110A and detected by the microphone has a sound level or loudness (SPL), which is measured in decibels (dBs). In some embodiments, the audible signal is determined by finding or is characterized by a root-mean-square (RMS) value measured from a signal generated by the microphone. In some embodiments, the communications device 121 of the electronic device 120 is configured to primarily detect a generated audible signal that has a loudness (SPL) greater than 50 dB or even 55 dB, such as between 60 and 100 dB, within a radius R.

At operation 215, the electronic device determines that the detected environmental characteristic, such as audible signal is associated with a user (e.g., first user 110A), or the environmental characteristic is associated with a local environment. The determining process can be made by software algorithms (e.g., software application 300A of FIG. 3) running on an electronic device 120. In some cases the association that a detected audible signal is associated with a user can be made due to the proximity of a sensor (e.g., microphone) to the user, and, in cases where there are more than one sensors (e.g., microphones) that are positioned to detect the environmental characteristic (e.g., audible signal), the magnitude of the environmental characteristic (e.g., sound level (e.g., SPL)) detected by the sensor (e.g., microphone) relative to other sensors (e.g., microphones) within the surrounding environment 100. In one example, the software algorithms may use various techniques, such as beamforming techniques, to detect the direction of an incoming audible signal and thus associate an audible signal with a user. In some cases, the determination that the detected audible signal is associated to a particular user is made simply by the association of a user with a particular electronic device (e.g., microphone of the first electronic device 120A) or the fact that a user is using the particular electronic device.

In some embodiments, the user 110A is located in a room, and the room contains a plurality of electronic devices 120 that are disposed in the room. In one embodiment, a plurality of microphones, which are each associated with one or more electronic devices 120, can be used to triangulate the audible signal and identify the user (e.g., the user 110A) creating the audible signal. In these embodiments, operation 210 includes the use of the audible signal from the plurality of microphones disposed in the room, and thus includes the audible signal received by more than one microphone in one or more electronic devices. The user 110A does not need to use an associated electronic device, although the audible signal from the associated electronic device, if present, can optionally be used in operation 210.

At operation 220, an analysis is performed on the received local environment data from the one or more sensors to determine if the received local environment data has characteristics that are conducive to maintaining a desired level within the local environment. In one example, an analysis is performed on the received local environment data from the one or more microphones to determine if the received local environment data has characteristics that are conducive to maintaining desired sound characteristics within the local environment. The analysis can be performed using software running on any of the electronic devices 120 and/or the host device 145, if present. In one embodiment, the analysis is performed on local environment data, received from the sensor within the communications device 121A, using software running on the first electronic devices 120A. In another embodiment, the analysis is performed on local environment data, received from the sensor within the communications device 121A and transferred to the host device 145, using software running on the host device 145. In yet another embodiment, the analysis is performed on local environment data, received from the sensor within the communications device 121A, and transferred to a second electronic device 120B, using software running on the second electronic device 120B.

In some embodiments, the analysis performed during operation 220 includes comparing one or more characteristics of the local environment data, which was measured by a sensor, with other environmental characteristic tolerance levels. In some embodiments, the analysis performed during operation 220 includes comparing one or more characteristics of the audible signal of the local environment data with other users' public and/or private sound characteristic tolerance levels. In one example, the one or more characteristics can include an instantaneous sound level, sound level at one or more frequencies, sound level averaged over time, or other detectable sound characteristic. The users' public and/or private sound characteristic tolerance levels, which were received and/or stored during operation 205, can be retrieved from memory of the electronic device 120 and/or the host device 140. In one example, the analysis includes a comparison of the received audible signal, which includes the detected sound levels associated with a user of the first electronic device 120A, and the second electronic device 120B users' public sound characteristic tolerance level, by use of one or more software algorithms running on the first electronic device 120A. In another example, the one or more characteristics can include an instantaneous or time averaged temperature level, $CO_2$ level, light level, occupancy level, or other detectable environmental characteristic.

In one embodiment, one or more of the electronic devices 120 are located in the same area as a user, such as user 110A. In this case, other electronic devices, such as a second electronic device 120B, can detect and send out information to a first electronic device 120A relating to a level of an environmental characteristic, such as the sound level of the user of the second electronic device 120B. The level of the environmental characteristic detected by the second electronic device 120B can also be used to determine the general environmental characteristic level of the region of the room. For example, the sound level detected by the second electronic device 120B can be used to determine the general sound level of the region of the room. In one further example, although the sound level of the room has been set to a maximum of about 70 dB, none, or few, of the users in the room are making noises at a level above about 55 dB. Thus, the sound level of the room actually reflects a maximum of about 55 dB. The general level of the environmental characteristic of the region of the room can be used to during the analysis performed in operation 220 to determine if the one or more environmental characteristics is large enough to warrant performing operation 240 in which an alert is provided to a user.

At operation 240, an alert is generated on the electronic device 120A when the analysis performed in operation 220 determines that the level of the environmental characteristic is greater than or is less than of a desired tolerance level within the local environment. In some embodiments, the electronic device 120A may include two or more desired tolerance levels for a local environment, where, for example, a first tolerance level can be used to provide a warning to a user that the current level of the environmental characteristic is close to exceeding a second tolerance level. In one example, an alert is generated on the electronic device 120A when the analysis performed in operation 220 determines that the received audible signal exceeds a desired sound characteristic tolerance level within the local environment. In another example, an alert is generated on the electronic device 120A when the analysis performed in operation 220 determines that a detected $CO_2$ level exceeds a desired $CO_2$ characteristic tolerance level within the local environment. In another example, an alert is generated on the electronic device 120A when the analysis performed in operation 220 determines that the air temperature within the environment is less than a desired room temperature tolerance level within the local environment. Operation 240 includes determining a level of the environmental characteristic (e.g., the current sound level) and determining a maximum level of the environmental characteristic (e.g., the sound level set by a user or the host device 145), according to one embodiment. Operation 240 may also include determining that a level of the environmental characteristic (e.g., the air temperature) and determining a minimum level of the environmental characteristic (e.g., the desired minimum temperature set by a user or the host device 145), according to another embodiment. In some embodiments, the electronic device 120A is also configured to monitor an environmental characteristic over a period of time, and thus determine a trend, or rate of change, of the environmental characteristic over a period of time and provide a warning to a user if the trend, or rate of change, in the environmental characteristic (e.g., ° C./min, ppm/min) exceeds a rate of change threshold level. In some embodiments, the electronic device 120A is configured to determine a trend, or rate of change, of the environmental characteristic over a period of time and provide a warning to a user if the trend, or rate of change, is causing the difference between the current trending environmental characteristic and a threshold level to decrease over time.

Operation 240 will include sending a message to the user 110A, according to one embodiment. For example, the message includes supportive information to the user 110A if the sound level of the user 110A is consistently lower than the sound levels set by the other users 110B, 110C. In another example, the message includes a warning that the user 110A is consistently higher than the sound level set by the other users 110B, 110C. In another example, the message includes a warning that the local environment has a temperature level, or $CO_2$ level, which is consistently higher than a level set by one or more of the other users 110B, 110C.

As discussed above, one example of a desirable tolerance level for one of the environmental characteristics is a maximum carbon dioxide ($CO_2$) level in the environment surrounding a user is desired to be less than 2000 ppm, such as less than 1000 ppm, or even less than about 800 ppm. In another example, a desirable tolerance level for another environmental characteristic is a maximum temperature level in the environment surrounding a user is desired to be less than 27° C. (80° F.), such as less than 24° C. (75° F.), or between about 18° C. (65° F.) and about 24° C. (75° F.). In another example, a desirable tolerance level for another environmental characteristic is a preferred light intensity level in the environment surrounding the user to be between about 250 lumens-per-square-meter (lux) and 1500 lux, such as 500 lux. In another example, a desirable tolerance level for another environmental characteristic is a maximum sound level in the environment surrounding a user is desired to be less than 70 dB, such as less than 55 dB.

The alert includes displaying information relating to the environmental characteristic (e.g., audible signal) on a GUI 595 of the first electronic device 120A, according to one embodiment. For example, the alert includes the first user's 110A sound levels in comparison to the sound levels of the other users 110B, 110C in the same room. The alert can also include the maximum level of the room (either set by the host device 145 and/or a super user of the host device, or as set by the actual sound levels of the room as described above). The alert can be sent or provided by a software application 300A (FIG. 3A) running on an electronic device 120, such as electronic device 120A for example. In response to the alert, the user 110A can adjust one or more environment type of environmental characteristics (e.g., adjust HVAC parameters (e.g., temperature, air flow, humidity)), lower his or her sound levels (e.g., volume level) below the allowed sound limit of the local environment, the user 110A can leave the room, or the user 110A can be alerted of a room or area that has a desirable environmental characteristic, such as accommodates the speaking sound level of the user 110A.

Operation 240 can also include displaying additional information on the display of the first electronic device 120A. The displayed additional information includes information relating to the environment 100 outside of the first local environment (e.g., the portion 100P). In some embodiments, a portion of the environment 100 is considered to be positioned outside of the first local environment since it is positioned a distance from the first local environment and the first electronic device 120A, such as distances exceeding the sphere of interaction radius R. In some embodiments, the additional information includes available conference rooms or other portions of the environment 100 that have environmental characteristic levels higher than the environment in which the user 110A is currently disposed and/or predicted sound level. In some embodiments, the additional information is provided to one or more users 110 that are consistently below an environmental characteristic threshold, and the additional information includes information relating to a quiet area is available and/or the sound level in different areas of the environment. In some embodiments, the information includes a location of a portion of the environment 100, a local sound level of the portion of the environment 100 and, a path or route directions from a current location of the first electronic device 120A to the location of the portion of the environment 100. This assists the user 110A in traveling from the user's 110A current location to the portion of the environment 100 that has more appropriate environmental characteristic levels for the user. In addition, the path or route directions includes areas of the environment 100 that have sound levels the same or higher than the user's 110A current sound level, so that the user 110A can maintain his or her current sound levels on the path without disturbing other users 110.

In some embodiments, before information is provided to a user or displayed on a device, the software running on an electronic device determines that a plurality of environmental characteristics associated with a portion of the environment 100, which is outside of the local environment, are at levels that are desirable and/or preferable to the user. In one example, it is determined that a second portion of the environment 100 has an air temperature that is within a desirable range of environmental characteristic preference levels, and a $CO_2$ level that is below a desired environmental characteristic preference level. In another example, it is determined that a second portion of the environment 100 has a sound level that is below a desired environmental characteristic preference level, an air temperature that is within a desirable range of environmental characteristic preference levels, and a $CO_2$ level that is below a desired environmental characteristic preference level. The process of displaying the information regarding the availability of a second region on a display or providing it to a user of an electronic device may include determining that a plurality of environmental characteristics within a second region of the environment are at desirable levels relative to the environmental characteristic preference levels of the user or of the environmental characteristic preference levels of a first region in which the user positioned.

Figure 3A:
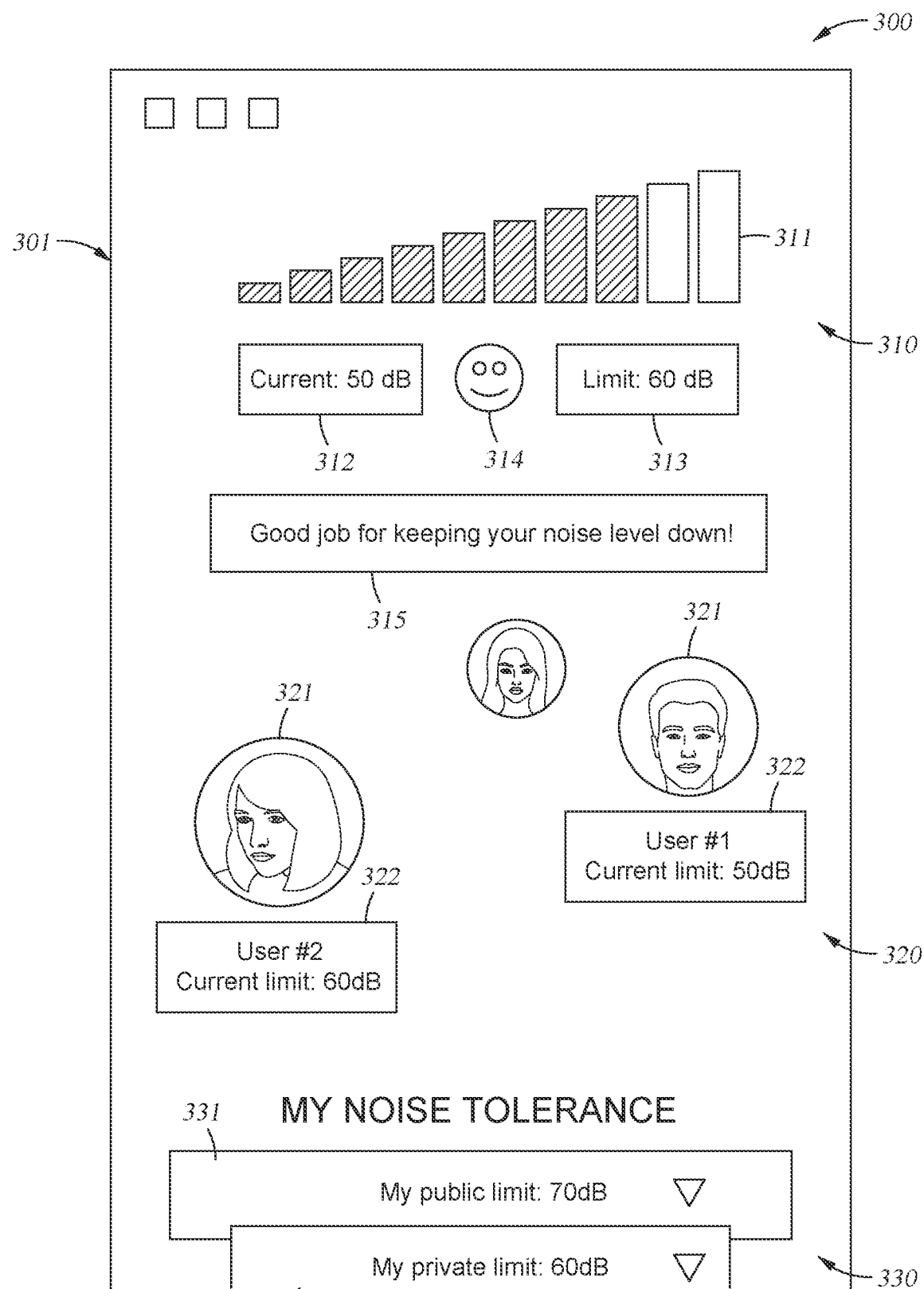
FIG. 3A illustrates a graphical representation of graphical user interface useful for a software application, according to one or more embodiments.

FIG. 3A illustrates a graphical representation of a graphical user interface (GUI) 301 useful for a software application 300, according to one or more embodiments. The GUI 301 can be the GUI 595 of the electronic device 120. The software application 300A can be used in the method 200, as will be described in more detail below. The software application 300 is configured to display sound levels and other local environment data transmitted and received from nearby electronic devices. The software application 300 can be part of software located and running on the electronic device 120. As shown, the software application 300 includes the GUI 301. The GUI 301 includes a current noise indicator 310, a local sound characteristic tolerance indicator 320, and a personal sound characteristic tolerance indicator 330. In some embodiments, the graphical user interface (GUI) 301 and software application 300 is provided within and utilized by one or more of the electronic devices 120, such as electronic device 120A-120D in FIG. 1B.

The current noise indicator 310 is configured to display the audible signal received from the electronic device 120 associated with the software application 300. The audible signal can be analyzed by software located within the electronic device 120, on the host device 145 (if present), on the communications device 121, on the processing device 105, or on any other device included in the environment 100.

As shown, the current noise indicator 310 includes a sound visual indicator 311, a sound level indicator 312, a limit indicator 313, a visual indicator 314, and a text indicator 315. The sound visual indicator 311 is generally a pictorial representation of current sound levels (e.g., SPL levels) picked up by an electronic device 120. For example, as shown in FIG. 3A, the sound visual indicator 311 includes a sound graph that is in the form of an increasing sound level type of bar chart. The sound graph can be black and white, or include one or more colors. The colors used in the sound visual indicator 311 can change with the audible signal in comparison to the local limit. For example, if the sound level received by the electronic device 120A is significantly lower than the local limit, the sound visual indicator 311 is green (e.g., the first three bars are filled in); if the sound level is lower than the local limit but within a set sound range, the sound visual indicator 311 is yellow (e.g., the first four to seven bars are filled in); and if the sound level is higher than the local limit, the sound visual indicator 311 is red (e.g., the first eight to ten bars are filled in). The current noise indicator 310 can be used in operation 210, where the electronic device 120A receives local environment data.

The sound level indicator 312 shows the current sound level in desired units, such as dB. The limit indicator 313 shows the limit level of the area in desired units, such as dB. The visual indicator 314 shows an icon, such as a smiley face or other emoji, that varies with the sound level in comparison to the local limit, and thus can be determined during operation 220 of method 200. For example, if the sound level received by the electronic device 120 is significantly lower than the local limit, the visual indicator 314 is a happy face, and if the sound level is higher than the local limit, the visual indicator 314 is a sad face. The text indicator 315 displays pre-chosen text that varies with the sound level in comparison to the local limit. For example, the text indicator 315 displays supportive messages when the user 110A consistently keeps his or her sound level below the level limit. The visual indicator 314 and the text indicator 315 can be used in operation 240, when an alert is generated on the electronic device 120A. For example, the visual indicator 314 and the text indicator 315 indicate to the user 110A that the user's 110A sound levels are too high.

The local sound characteristic tolerance indicator 320 indicates the desired sound limit of nearby users, and can be received by the electronic device 120 during operation 205 of method 200. As shown, the local sound characteristic tolerance indicator 320 includes one or more user icons 321 and one or more limit indicators 322. Each user icon 321 may display information about the associated user, such as the user's name, profile picture, title, and the like. Each user icon 321 can be sized differently, depending on the distance of the associated user 110A from the user 110B of the electronic device 120B. Each user sets his or her desired sound limit (e.g., the user 110B on the electronic device 120B), and each limit indicator 322 is associated with a user. The limit indicator 322 allows other the user 110B to broadcast his or her desired sound limits, without explicitly telling other users 110A, 110C in the area about his or her preferences. The local sound characteristic tolerance indicator 320 can be input in operation 205, where users 110 input one or more sound preferences into the respective electronic device 120.

The personal tolerance indicator 330 is set by a user (e.g., user 110B on the electronic device 120B) and the relevant information can be broadcast from the electronic device associated with a user (e.g., user 110B) to those nearby, without explicitly telling other users (e.g., users 110A, 110C) in their area about his or her preferences. As shown, the personal sound characteristic tolerance indicator 330 includes a public sound characteristic tolerance indicator 331 and a private sound characteristic tolerance indicator 332. The public sound characteristic tolerance indicator 331 is visible to other users, whereas the private sound characteristic tolerance indicator 332 is not visible to other users. This allows the user (e.g., user 110B) to display a public sound characteristic level using the software application 300 while actually keeping a preferred higher or lower sound characteristic level private. Thus, the user (e.g., user 110B) can anonymously control the sound level of a room without fear of irritating other users (e.g., users 110A, 110C) with his or her public sound characteristic preference. Once the user sets the sound characteristic tolerance indicators 331, 332 on his or her electronic device (e.g., device 120B), the electronic device transmits information including the sound characteristic sound characteristic tolerance indicators to other electronic device(s) (e.g., 120A, 120C) in the environment 100. Each of the public and private sound characteristic tolerance indicators 331, 332 can be automatically set depending on the type of equipment used by the user (e.g., 110B). For example, if the user 110B uses a headset with a microphone, each of the sound characteristic tolerance indicators 331, 332 can be set to a higher level than indicators for a microphone on a tablet, as the headset is typically provided to capture speech from a user and the sound level can be raised to reflect this. The personal sound characteristic tolerance indicator 330 can be used in operation 205, where users 110 input one or more sound preferences into the respective electronic device 120.

Figure 3B:
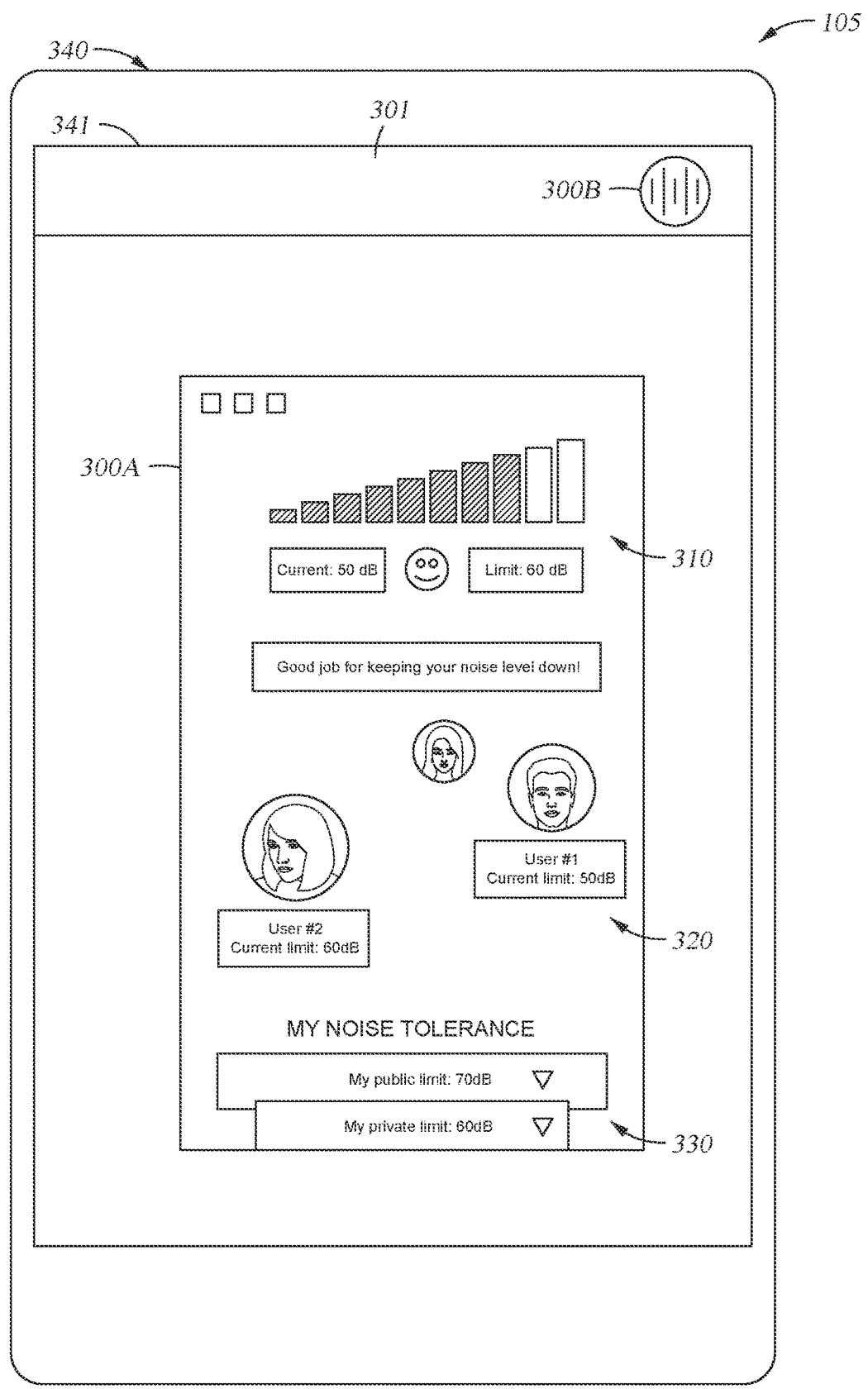
FIG. 3B illustrates one or more elements of graphical user interface useful for display on an electronic device, according to one embodiment.

FIG. 3B illustrates one or more elements of the GUI 301 useful for display on the electronic device 120, according to one embodiment. As shown, the GUI 301 is displayed on the screen 340 of the electronic device 120. The screen 340 is any typical screen configured to display an operating system, such as a phone screen or computer monitor. A status icon 300B is configured to display some of the information contained in the software application 300A, which can be similar to the software application 300 in FIG. 3A. The status icon 300B can be displayed on a notification bar 341 displayed in the GUI 301. In some embodiments, when the status icon 300B is clicked or tapped by the user, the software application 300A is displayed.

Figure 3C:
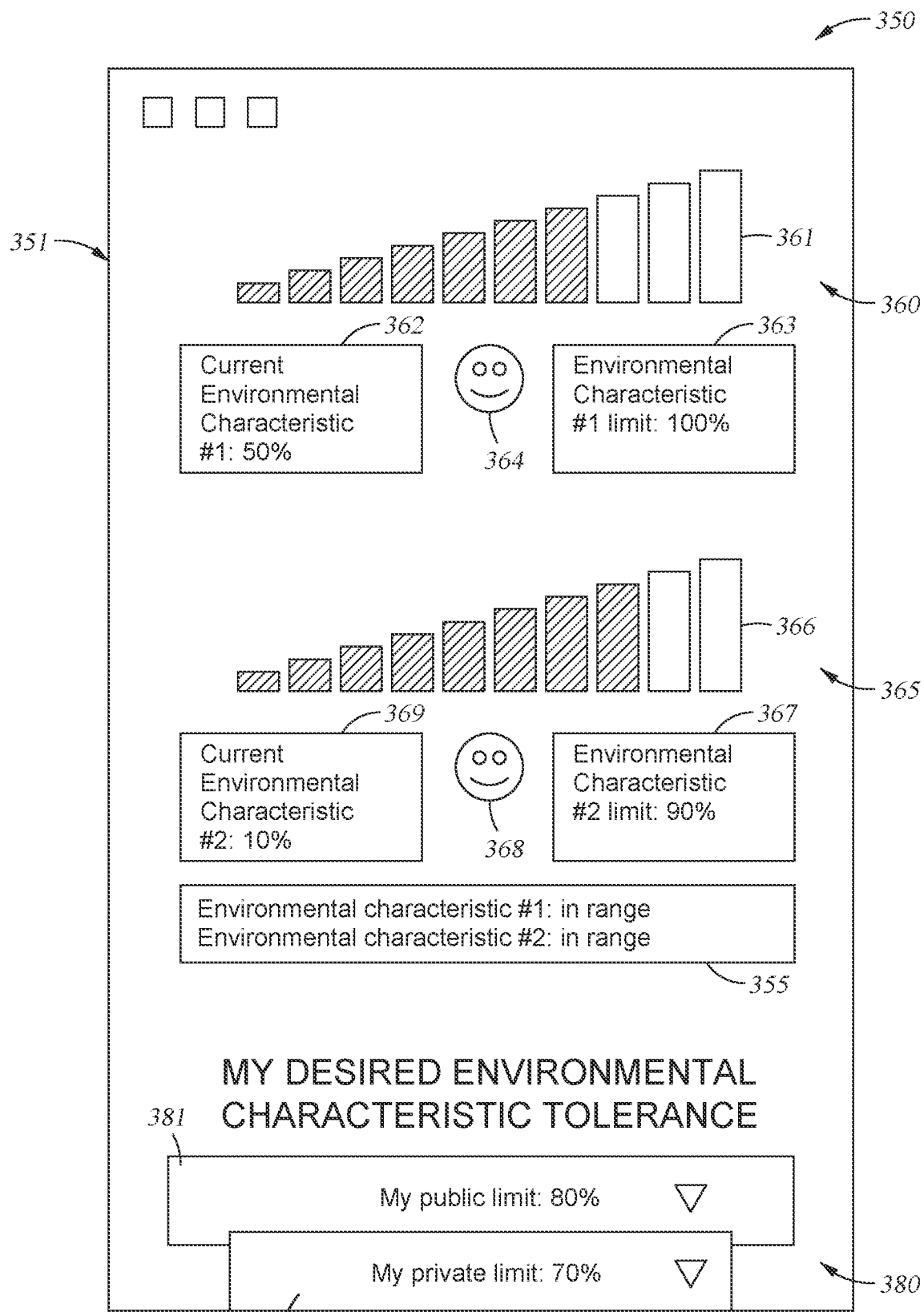
FIG. 3C illustrates a graphical representation of graphical user interface useful for a software application, according to one or more embodiments.

FIG. 3C illustrates a graphical representation of a graphical user interface (GUI) 351 useful for a software application 350, according to one or more embodiments. The GUI 351 can be the GUI 595 of the electronic device 120 illustrated in FIG. 5. The software application 350 can be used in the method 200, as will be described herein. The software application 350 is configured to display environmental characteristic levels and other local environment data transmitted and received from nearby electronic devices. The software application 350 can be part of software located and running on the electronic device 120. As shown, the software application 350 includes the GUI 351. The GUI 351 includes a first current environmental characteristic level indicator 360, a second current environmental characteristic level indicator 370, and a personal environmental characteristic tolerance indicator 380. In some embodiments, the graphical user interface (GUI) 351 and software application 350 is provided within and utilized by one or more of the electronic devices 120, such as electronic device 120A-120D in FIG. 1B.

The first current environmental characteristic level indicator 360 is configured to display the current level of a first environmental characteristic received from a sensor coupled to the electronic device 120. The first environmental characteristic can be analyzed by software located within the electronic device 120, on the host device 145 (if present), on the communications device 121, on the processing device 105, or on any other device included in the environment 100.

As shown, the first current environmental characteristic level indicator 360 includes a first indicator 361, a second indicator 362, a limit indicator 363, a visual indicator 364, and a text indicator 355. The first indicator 361 is generally a pictorial representation of a level of a first environmental characteristic (e.g., temperature level) picked up by a sensor coupled to the electronic device 120. For example, as shown in FIG. 3C, the first indicator 361 includes a temperature level graph that is in the form of an increasing temperature level type of bar chart. The temperature graph can be black and white, or include one or more colors. The colors used in the first indicator 361 can change with the audible signal in comparison to the local limit. For example, if the environmental characteristic's level is significantly lower than a desired limit, the first indicator 361 is blue (e.g., the first three bars are filled in); if the environmental characteristic's level is lower than the local limit but within a set range, the first indicator 361 is green (e.g., the first four to seven bars are filled in); and if the environmental characteristic's level is higher than the local limit, the first indicator 361 is red (e.g., the first eight to ten bars are filled in). The first current environmental characteristic level indicator 360 can be used in operation 210, where the electronic device 120A receives local environment data.

The second indicator 362 shows the current environmental characteristic level in desired units, such as percent full scale (% FS). The limit indicator 363 shows the limit level of the area in desired units, such as percent full scale (% FS). The visual indicator 364 shows an icon, such as a smiley face or other emoji, which varies with the environmental characteristic level in comparison to the local limit, and thus can be determined during operation 220 of method 200. For example, if the environmental characteristic level received by the electronic device 120 is significantly lower than the local limit, the visual indicator 364 is a sad face, and if the sound level is higher than the local limit, the visual indicator 364 is a happy face. The text indicator 355 displays pre-chosen text that varies with the environmental characteristic level in comparison to the local limit. For example, the text indicator 355 displays supportive messages when local environment is consistently within a desired range. The visual indicator 364 and the text indicator 355 can be used in operation 240, when an alert is generated on the electronic device 120A. For example, the visual indicator 364 and the text indicator 355 indicate to the user 110A that the user's 110A environmental characteristic levels are too high.

The second indicator 365 is generally a pictorial representation of a level of a second environmental characteristic (e.g., $CO_2$ level) picked up by a sensor coupled to the electronic device 120. For example, as shown in FIG. 3C, the third indicator 366 includes a $CO_2$ level graph that is in the form of an increasing $CO_2$ level type of bar chart. As similarly described above, the $CO_2$ level graph can be black and white, or include one or more colors, and can change with the audible signal in comparison to the local limit. The second current environmental characteristic level indicator 365 can be used in operation 210, where the electronic device 120A receives local environment data.

The fourth indicator 369 shows the current environmental characteristic level in desired units, such as percent full scale (% FS). The limit indicator 367 shows the limit level of the area in desired units, such as percent full scale (% FS). The visual indicator 368 shows an icon, such as a smiley face or other emoji, which varies with the environmental characteristic level in comparison to the local limit, and thus can be determined during operation 220 of method 200. The text indicator 355 can also display pre-chosen text that varies with the second environmental characteristic level in comparison to the local limit. For example, the text indicator 355 displays supportive messages when local environment is consistently within a desired range. The visual indicator 368 and the text indicator 365 can be used in operation 240, when an alert is generated on the electronic device 120A. For example, the visual indicator 368 and the text indicator 355 indicate to the user 110A that the user's 110A environmental characteristic levels are too high.

The personal tolerance indicator 380 is set by a user (e.g., user 110B on the electronic device 120B) and the relevant information can be broadcast from the electronic device associated with a user (e.g., user 110B) to those nearby, without explicitly telling other users (e.g., users 110A, 110C) in their area about his or her preferences. As shown, the personal environmental characteristic tolerance indicator 380 includes a public environmental characteristic tolerance indicator 381 and a private environmental characteristic tolerance indicator 382. The public sound characteristic tolerance indicator 381 is visible to other users, whereas the private environmental characteristic tolerance indicator 382 is not visible to other users. This allows the user (e.g., user 110B) to display a public environmental characteristic level using the software application 350 while actually keeping a preferred higher or lower environmental characteristic level private. Thus, the user (e.g., user 110B) can anonymously control the environmental characteristic of a room without fear of irritating other users (e.g., users 110A, 110C) with his or her public environmental characteristic preference. Once the user sets the environmental characteristic tolerance indicators 381, 382 on his or her electronic device (e.g., device 120B), the electronic device transmits information including the sound characteristic sound characteristic tolerance indicators to other electronic device(s) (e.g., 120A, 120C) in the environment 100. Each of the public and private environmental characteristic tolerance indicators 381, 382 can be automatically set depending on the type of equipment used by the user (e.g., 110B). The personal sound characteristic tolerance indicator 380 can be used in operation 205, where users 110 input one or more environmental characteristic preferences into the respective electronic device 120.

Figure 4:
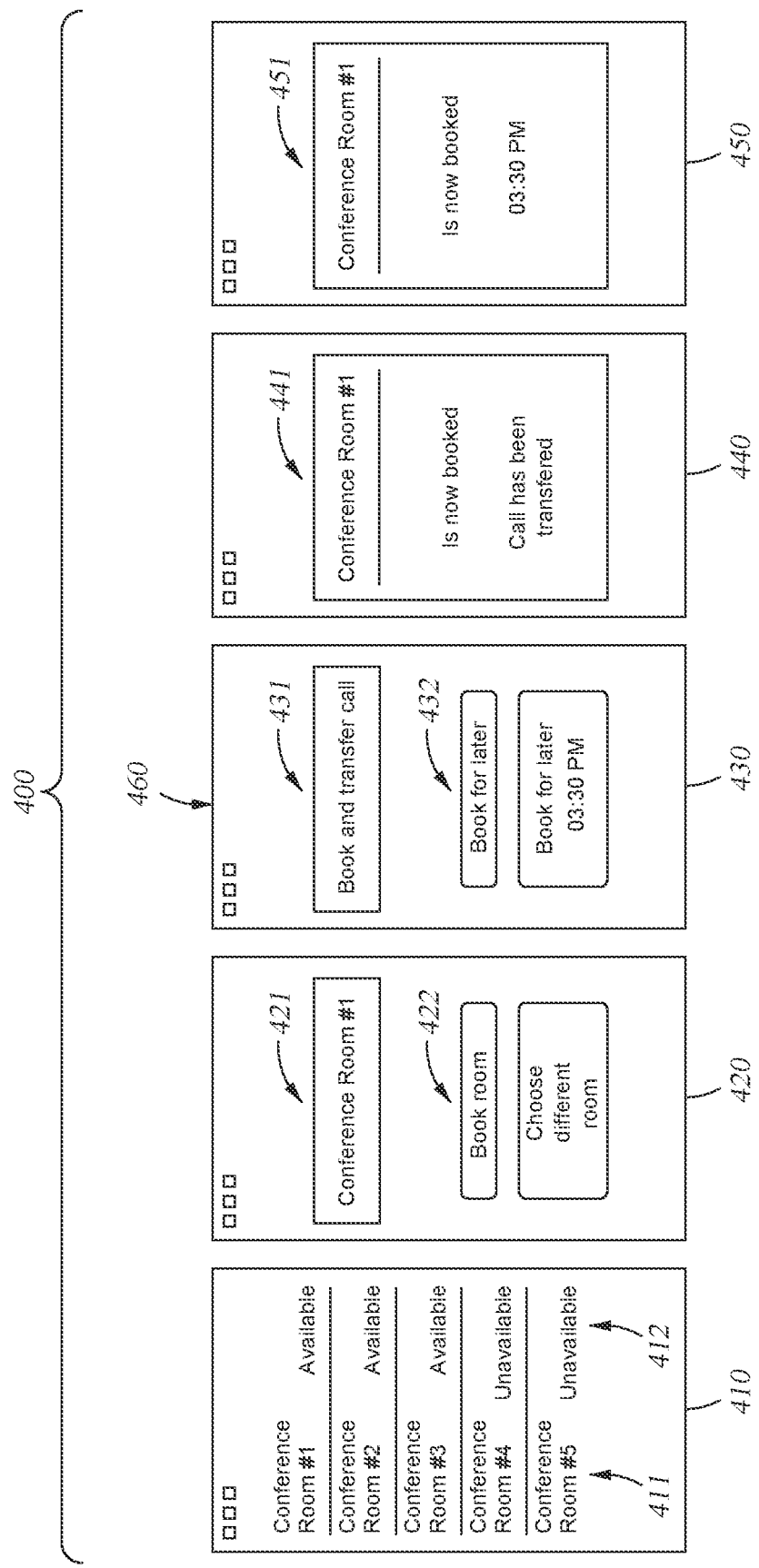
FIG. 4 illustrates a series of graphical user interface screens for a software application, according to one embodiment.

FIG. 4 illustrates a series 400 of GUI screens 410, 420, 430, 440, 450 for a software application 460 that is configured to run on an electronic device 120, according to one embodiment. In one embodiment, the software application 460 is configured to help the user find an appropriate meeting room. In one example, the user 110A is interested in finding an appropriate meeting room since it was determined during performance of at least a portion of method 200 that the user 110A was exceeding the desired environmental characteristic level, such as sound characteristic level, within the local environment. In another example, the user 110A is simply interested in finding an appropriate meeting room to avoid being put into a position of exceeding the desired environmental characteristic level within the local environment due to an upcoming activity in which the user will, for example, generate some noise (e.g., conference call). The software application 460 is configured to connect to an office environment booking system, such as Logitech Sync. The software application 460 can be a part of the software application 300, 300A and be used in operation 240, where an alert is generated on the electronic device 120A. For example, the software application 460 helps the user 110A find an available meeting room.

In some embodiments, software application 460 includes a calendar application, which is saved within memory of one or more of the electronic devices 120, that includes information regarding scheduled times and dates that the meeting room is reserved. The calendar application can also have the capability to notify a user of one or more of the electronic devices 120 that a meeting room is available, or is becoming available after a certain period of time has elapsed, based on the generation or receipt of an alert created by the software application 300, 300A. In some embodiments, the calendar application is loaded onto to a local server that controls the scheduling of one or more meeting rooms. In this configuration, the calendar application positioned on the server can be updated and/or be accessed by one or more electronic devices 120.

During the use of the electronic device 120, the user 110A may initially be shown the first GUI screen 410 upon beginning use of the software application 460. As shown, the first GUI screen 410 includes a list 411 of one or more conference rooms (e.g., conference rooms 104, 107), and a list of a corresponding status 412 of each of the conference rooms. The capacity of people allowed in each of the conference rooms is shown in the list 411. The list 411 shows whether the conference room is available. When the user 110A selects one of the conference rooms in the list 411, the second GUI screen 420 is shown.

As shown, the second GUI screen 420 includes a room status 421 and a plurality of choice buttons 422. The room status 421 includes information about the name of the room and the room capacity. The plurality of choice buttons 422 allow the user 110A to choose the current room, or to go back and choose another room. If the user 110A chooses the current room, the software application 460 displays the third GUI screen 430. If the user 110A chooses to go back to a previous screen, the software application 460 displays the first GUI screen 410.

As shown, the third GUI screen 430 includes a book room button 431 and a schedule room button 432. If the user 110A chooses the book room button 431, the electronic device 120 books the chosen meeting room by communicating the reservation of the room to one or more electronic device 120 and/or the host device 145. During this process the electronic device 120 may also send a request to the host device 145 or other electronic devices 120 to make sure that the selected meeting room is still available by polling the various devices. The software application 460 may then display the fourth GUI screen 440. The host device 145 or electronic device 120 may also transfer the user's 110A current call or related activity to a conferencing device (e.g., the conferencing device 111) present in the chosen room, according to one embodiment. The call can be either an audio call or a video call.

As shown, the fourth GUI screen 440 includes a message 441. The message 441 tells the user 110A that the chosen room has been successfully booked. The message 441 also tells the user 110A that the user's current call has been successfully transferred, according to one embodiment.

If the user 110A chooses the schedule room button 432, the software application 460 displays the fifth GUI screen 450. During this process the electronic device 120 may send a request to the host device 145 or other electronic devices 120 to make sure that the selected meeting room is available by polling the various devices. As shown, the fifth GUI screen 450 includes a schedule message 451. The schedule message 451 tells the user 110A that the chosen room has been successfully booked at a given time and date.

The software application 460 can transfer the first user's current call to a conferencing device (e.g., conferencing device 111) located in a conference room. The software application 460 also can schedule a conference room for the future, which allows the first user 110A to continue the call at a later date and time.

Although five GUI 410, 420, 430, 440, 450 are described herein, it is understood that additional GUI screens could be included in the software application 460. For example, one or more error screens can be included if there is an issue with booking the room, transferring the call, scheduling the meeting room, and the like.

Referring back to operation 240, in some embodiments, the alert provided to a user includes a suggestion for a room that is open. The room can either be an empty conference room, or another room and/or area of the office that is more suitable for the first user 110A based on one or more environmental characteristics. In some cases, the suitable nature of a room will relate to a user's current or typical average sound level. The room suggested is based on at least one of a proximity, availability, a monitored environmental characteristic (e.g., $CO_2$ level), the user's 110A desired volume level, and the user's monitored volume level and/or historical volume level. The electronic device 120 or host device 145 can also suggest rooms based on future availability. For example, the host device 145 does not suggest a room that will soon be booked for another meeting. The room suggested can also be based on the pathway needed to reach the room. For example, the pathway can be through other loud areas, as to not disturb users in quiet areas on the way to the chosen room.

FIG. 5 illustrates a schematic diagram of the electronic system 500, according to one embodiment. As shown, the electronic system 500 includes the one or more electronic devices 120. The various components within the electronic system 500 are configured to communicate with each other using a wired or wireless communication link 127, 128. The electronic system 500 will thus include a plurality of communication links 127, 128 that allow the various components of the electronic system to interact with one another. In general, the various components of the electronic system 500, such as the electronic devices 120, or electronic devices 120 and the host device 145, are configured to communicate with each other using a wired or wireless communication link 127, 128. In some embodiments, the electronic system 500 also includes a conferencing device 111, such as video conferencing device, speaker phone or other useful device.

As discussed above, typically, each of the one or more electronic devices 120 includes an assembly that includes at least one of a processing device 105 and a communications device 121. In one embodiment, as illustrated in FIG. 5, each electronic device 120 includes a processing device 105 and a communications device 121 that are in wired or wireless communication with each other. The electronic devices 120 can each be coupled to a power source (e.g., wall outlet), although the electronic device can alternately receive power from a battery. For example, the electronic device 120 is located in a conference room, and the electronic device is wall powered. In another example, the electronic device 120 is located in a conference room but has very low power consumption (i.e., the charge lasts for about 1 year or more), and thus the electronic device is powered by a battery or rechargeable battery. In yet another example, the communication device 121 is connected by universal serial bus (USB) to the processing device 105, and thus the processing device provides power to the communication device.

As shown in FIG. 5, the processing device 105 of the electronic device 120 includes a processing system 506 and memory 507. The memory contains stored data 108 and one or more software applications 509, such as a software application 300A and software application 460. As shown, the processing system 506 includes input/output (I/O) devices 506A, a processor 506B, and a transceiver 506C. The processor 506B can include a central processing unit (CPU), a digital signal processor (DSP), and/or application-specific integrated circuits (ASIC), and other useful components. The I/O devices 506A within the processing device 105 include a speaker 511, a display device 512, a touch sensing device 513, and a sound sensing device 514. The one or more transceivers 506C are configured to establish a wired or wireless communication link 127 with other transceivers residing within other computing devices.

The I/O devices 506A within the processing device 105 can include motion sensing devices (e.g., accelerometers), magnetic field sensing devices, or other useful sensors that can be used to sense the interaction of the processing device 105 and the user. The I/O devices 506A can also include one or more timing devices, such as a clock (not shown), that are configured to provide time related information to the processor 506B within the processing system 506. The clock can be a simple IC or similar component, such as a crystal oscillator. The software applications, such as software application 509, can include software applications 309A and 460 that are configured to run in the foreground or background on the processing device 105. The software applications are used to control one or more activities being performed by the processing device 105 and/or provide some useful input to the user via audio or visual means provided by the processing devices 105.

The memory 507 can be any technically feasible type of hardware unit configured to store data. For example, memory 507 includes some form of non-volatile memory, such as a hard disk, a random access memory (RAM) module, a flash memory unit, or a combination of different hardware units configured to store data. Software application 509, which is stored within the memory 507, includes program code that can be executed by processor 506B in order to perform various functionalities associated with the processing device 105. The stored data 508 can include any type of information that relates to the public and/or private environmental characteristics (e.g., sound characteristic) tolerance levels, configuration or control information for the electronic device, user preference data, electronic device control information, electronic device and/or system configuration information, useful software applications, or other useful information.

As shown in FIG. 5, in some embodiments, the communications device 121 includes a controller 530 and a graphical user interface (GUI) 595. The controller 530 can be any conventional electronic computing device. As shown, the controller includes a processing system 535 and a transceiver 555. As shown, the processing system 535 includes memory 533, input/output (I/O) devices 532, and a processor 534. The processor 534 can include a central processing unit (CPU), a digital signal processor (DSP), and/or application-specific integrated circuits (ASIC), and other useful components. The memory 533 can include conventional non-volatile memory that has one or more software applications or software programs (not shown) stored therein. In some embodiments, the memory 533 includes instructions, which when executed by the processor 534, are adapted to perform at least some portions of method 200. In some embodiments, a portion of the method 200 is performed by the controller 530 (e.g., operations 210-215) and another portion of the method is performed by the components of the processing device 105 (e.g., operations 220-240). However, in some embodiments of the electronic system 500, the communications device 121 is an electronic device that essentially includes a microphone and related supporting electronics, and thus, in this case, the computer instructions used to perform the method 200 is primarily performed by the various components within the processing device 105.

The electronic device 120 will generally use local environment data to determine, by use of one or more software applications 509 executed by the processor within the processing device, what to display to the user of the processing device. In general, the electronic device 120 includes electrical components that have the capability of storing, processing and/or delivering information to another electronic device 120.

The I/O devices 532 can also include one or more sensors that are configured to sense one or more environmental characteristics, such as sense audible sounds generated by a user, and in some configurations detect environmental characteristics that exceed desired levels and/or even distracting activities performed by a user. In some embodiments, the one or more sensors include an omnidirectional microphone that is configured to convert sound waves into an electrical signal. In some embodiments, the one or more sensors include a beamforming microphone that is configured to preferentially detect audible signals in various directions and convert the detected sound waves into an electrical signal. The sensors may also include a motion sensing device (e.g., accelerometers), temperature sensors, air composition detection sensors, air speed sensors, light level sensors, humidity sensors, optical sensing devices, or other similar sensing devices.

In some embodiments, the electronic system 500 includes one or more conferencing devices 111. The one or more conferencing devices 111 include a video camera device that includes a digital camera (e.g., charge-coupled device (CCD) camera or complementary metal-oxide-semiconductor (CMOS) camera), a keyboard that is coupled to the controller 530, and a speaker phone, speaker, or other electronic device that is useful for video and/or conferencing, according to some embodiments. In one example, one or more of the video conferencing devices 111 are an Ultimate Ears Boom™ speaker, a Harmony™ universal remote control, a Logitech Connect™ video conferencing device, or a Logitech BCC950™ video conferencing device, that are all available from Logitech USA of Newark, CA or Logitech Europe S.A. of Lausanne, Switzerland.

In general, the one or more conferencing devices 111 are in communication with one or more of the electronic devices 120 via one or more communication links 127. The controller 530 can be in communication with one or more devices that are positioned and configured to enable the formation of communication with a host device 145 using the communication link 127. In some cases, the communication link 127 can support the transmission of video conference feeds that include audio and video streams, which allows for the communication link 127 to be formed on a high performance network that is connected to a local area network (LAN) present in each communication location and/or across multiple communication locations on a wide area network (WAN).

The host device 145 is configured to retrieve, transmit, analyze, and determine information from various components of the electronic system 500. As shown, the host device 145 includes a controller 598 and a transceiver 597. The transceiver 597 is configured to communicate with various components of the electronic system 500 via any of the communication methods described herein.

The controller 598 can be any form of conventional electronic computing device. As shown, the controller 598 includes memory 598A, input/output (I/O) devices 598B, and a processor 598C. The processor 598C can include a central processing unit (CPU), a digital signal processor (DSP), and/or application-specific integrated circuits (ASIC), and other useful components. The memory 598A can include conventional non-volatile memory that has one or more software applications or software programs (not shown) stored therein. The method 200 can be stored or accessible to the controller 598 as non-transient computer readable media containing instructions, that when executed by a processor of the controller 598, cause the electronic system 500 to perform the method 200.

Environmental Control

In some embodiments, an electronic device 120 or host device 145 monitors or receives input from other electronic devices 120 positioned within various areas of the environment 100 and automatically determines desirable and undesirable environmental characteristic containing areas, such as loud and quiet areas, based on a relative comparison of collected environment data and/or by use threshold levels stored in memory of the electronic device 120 or host device 145. For example, if one region of the environment 100 has users 110 who consistently remain below a sound level of about 55 dB, the host device 145 labels that area as a quiet zone. The electronic device 120 or host device 145 can be programmed to prompt users to maintain a minimum or maximum of quiet and/or loud zones in the environment 100 (e.g., the host device ensures that at least one quiet area is kept in the office environment at all times). The electronic device 120 or host device 145 can be programmed to maintain a minimum or maximum of quiet and/or loud area (in $m^2$ or $ft^2$) in the environment 100.

In some embodiments, an electronic device 120 or host device 145 stores the received environmental data and/or device configurational data in the memory, such as memory 598A of a host device 145. The electronic device 120 or host device 145 may record the change in an environmental characteristic in the environment 100 over the course of a day, a day of a week, week(s), month(s), and/or year. In one example, the electronic device 120 or host device 145 may record a change in temperature and/or gas composition (e.g., $CO_2$ level) in the environment 100 over the course of a day, days of a week, week(s), month(s), and/or year. In another example, the electronic device 120 or host device 145 may record the change of quiet zones and loud zones in the environment 100 over the course of a day, day of a week, week(s), month(s), and/or year. The electronic device 120 or host device 145 may also record the behavior of users 110 in the environment 100 over the course of a day, week, month, and/or year. For example, the host device 145 tracks how often a given user 110 is alerted to lower his or her volume, and how often the user moves to a loud or quiet zone. In another example, the host device 145 tracks how the user's 110A sound levels change with time (e.g., the user 110A gets louder from the beginning of the phone call compared to the end of the phone call). Thus, a user 110A who becomes louder over time can be asked to move to a loud area, even though at the given moment the user 110A is under the current maximum sound limit of the room the user occupies.

An electronic device 120 or the host device 145 can also be used to track the total movement of the users 110 throughout the environment 100 as the users move from quiet to loud zones and vice versa. This allows a power-user of the host device 145 to determine more optimal layouts of the environment 100 (e.g., number of loud and quiet zones, and/or location of loud and quiet zones). In addition, the power-user and/or the host device 145 can use this information to suggest buying noise-canceling headsets or other equipment for users 110 that more frequently require quiet areas. The host device 145 can also track the language of the user 110 by using language-recognizing algorithms. Thus, the host device 145 can track the different languages used by users 110 and whether the user's 110A language affects other users 110B, 110C that don't speak the given language.

In some embodiments, an electronic device 120 or the host device 145 can also be used to track productivity of one or more users or provide input regarding a user's productivity based on a sound characteristic detected within the environment 100. A person's productivity can be monitored or determined by detecting how many times the user had to seek a quieter space within an environment.

Thus, a given room can be designated as a quiet area (e.g., the first employee work room 102), and another room can be designated as a collaborative area (e.g., the second employee work room 103, the first conference room 104, and/or the second conference room 107). In the quiet area, the one or more electronic devices 120 disposed within the room (e.g., electronic device 120B and/or processing devices in use by the users 110) can monitor the sound and track whether the sound level is below the quiet limit. In the collaboration area, the one or more electronic devices 120 disposed within the room (e.g., electronic devices 120C, 120D, 120E and/or processing devices in use by the users 110) can monitor the sound and track whether the sound level is below the collaboration limit.

As described above, a computer implemented method is provided. The method includes receiving local environment data, transmitting the local environment data, determining status information from one or more secondary electronic devices, and generating an alert on a processing device. Also provided is a non-transient computer readable medium containing program instructions for causing a host device to perform the method. An electronic system is provided to perform the method. The method allows for monitoring sound levels of various users in an office environment.

The method and electronic system allows users in the office environment to provide anonymous feedback to users that do not maintain an appropriate sound level. The user also does not need to worry that the user is being too loud for the users nearby, as the nearby users can anonymously warn the user about his or her sound levels without direct confrontation. The method and electronic system also provides for solutions to the user to move either to an area with more appropriate sound levels or to book a conference room. The method and electronic systems allow for monitoring and creating areas of an open-plan office with loud and quite regions for more effective location of workers in the office.

The method and electronic system disclosed herein also allow users in a business, home or an educational environment to receive input regarding the status of one or more detected environmental characteristics within their local environment or overall environment, so that one or more of the users can make changes to the their environment and/or move to a different environment based on feedback provided from the electronic system.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer implemented method, comprising:
   receiving, at a first electronic device within a first region of an environment, local environment data, wherein the local environment data comprises information regarding one or more environmental characteristics detected within the first region of the environment, wherein the one or more environmental characteristics comprise a first environmental characteristic and an occupancy level within the first region of the environment;
   determining that a level of the first environmental characteristic of the environmental characteristic is greater than or less than a first environmental characteristic preference level;
   receiving, at the first electronic device, availability information, wherein the availability information comprises information regarding an availability of a second region of the environment; and
   displaying the availability information on a display of the first electronic device after determining that the first environmental characteristic is greater than or less than the first environmental characteristic preference level and the second region of the environment has an occupancy level equal to or greater than the occupancy of the first region.

2. The computer implemented method of claim 1, wherein the first environmental characteristic is an environmental characteristic that does not include sound level.

3. The computer implemented method of claim 1, further comprising:
   receiving, at the first electronic device, local environment data detected in the second region;
   comparing a characteristic of the local environment data detected in the second region with the first environmental characteristic preference level or the local environment data of the first region; and
   displaying additional information on the display of the first electronic device, wherein the displayed additional information comprises information relating to the second region.

4. The computer implemented method of claim 1, wherein the first environmental characteristic comprises information relating to an air temperature within a local region of the environment.

5. The computer implemented method of claim 1, wherein the first environmental characteristic comprises information relating to a $CO_2$ level within a local region of the environment.

6. The computer implemented method of claim 1, wherein the first environmental characteristic comprises information relating to a lighting level within a local region of the environment.

7. The computer implemented method of claim 1, further comprising:
   receiving, from a second electronic device, the first environmental characteristic preference level before determining that the environmental characteristic level is greater than the first environmental characteristic preference level.

8. The computer implemented method of claim 1, wherein displaying the availability information on a display of the first electronic device further comprises:
   determining that a plurality of environmental characteristics within the second region of the environment are at desirable levels relative to the environmental characteristic preference levels of a user or of the environmental characteristic preference levels of the first region.

9. The computer implemented method of claim 1, wherein the environmental characteristic is a gas composition.

10. A computer implemented method, comprising:
   receiving, at a first electronic device within a first region of an environment, local environment data, wherein the local environment data comprises information regarding environmental characteristic levels detected in the first region of the environment, wherein the environmental characteristic levels comprise a first environmental characteristic and an occupancy level within the first region of the environment;
   determining that a level of the first environmental characteristic is greater than or less than a first environmental characteristic preference level;
   receiving, at the first electronic device, availability information, wherein the availability information comprises information regarding an availability of a second region of the environment after it is determined that the second region of the environment has an occupancy level equal to or greater than the occupancy level of the first region;
   generating an alert on the first electronic device, wherein the alert is generated after it is determined that the level of the first environmental characteristic is greater than or less than the first environmental characteristic preference level and after receiving the availability information; and then displaying the availability information and information relating to the alert on a display associated with the first electronic device.

11. The computer implemented method of claim 10, wherein the first environmental characteristic is an environmental characteristic that does not include sound level.

12. The computer implemented method of claim 10, wherein the first environmental characteristic comprises information relating to an air temperature within a local region of the environment.

13. The computer implemented method of claim 10, wherein the first environmental characteristic comprises information relating to a $CO_2$ level within a local region of the environment.

14. The computer implemented method of claim 10, wherein the first environmental characteristic comprises information relating to a lighting level within a local region of the environment.

15. The computer implemented method of claim 10, further comprising:
   receiving, at the first electronic device, local environment data detected in the second region;
   comparing a characteristic of the local environment data detected in the second region with the first environmental characteristic preference level or the local environment data of the first region; and
   displaying additional information on the display associated with the first electronic device, wherein the displayed additional information comprises information relating to the second region.

16. The computer implemented method of claim 10, wherein the displaying the availability information further comprises at least one of:
   information relating to a location of the second region of the environment;
   a local environmental characteristic level of the second region of the environment; and
   a route direction from a current location of the first electronic device to the location of the second region of the environment.

17. The computer implemented method of claim 10, further comprising:
   receiving, from a second electronic device, the first environmental characteristic preference level before determining that the environmental characteristic level is greater than or less than the first environmental characteristic preference level.

18. The computer implemented method of claim 10, wherein the environmental characteristic is a gas composition.

19. A computer implemented method, comprising:
   receiving, at a first electronic device within a first region of an environment, local environment data, wherein the local environment data comprises information regarding environmental characteristic levels in the first region of an environment, wherein the environmental characteristic levels comprise a first environmental characteristic and an occupancy level within the first region of the environment;
   determining that the level of the first environmental characteristic is greater than a first environmental characteristic preference level;
   receiving, at the first electronic device, availability information, wherein the availability information is derived from determining that an occupancy level detected in a second region of the environment is equal to or greater than the occupancy level of the first region;
   generating an alert by the first electronic device, wherein the alert is generated after it is determined that the level of the first environmental characteristic is greater than the first environmental characteristic preference level and after receiving the availability information; and
   then displaying the availability information and information relating to the alert on a display associated with the first electronic device.

20. The computer implemented method of claim 19, wherein the first environmental characteristic comprises information relating to an air temperature within a local region of the environment.

21. The computer implemented method of claim 19, wherein the first environmental characteristic comprises information relating to a $CO_2$ level within a local region of the environment.

22. The computer implemented method of claim 19, wherein the first environmental characteristic comprises information relating to a lighting level within a local region of the environment.

23. The computer implemented method of claim 19, further comprising:
   receiving, at the first electronic device, local environment data detected in the second region;
   comparing a characteristic of the local environment data detected in the second region with the first environmental characteristic preference level or the local environment data of the first region; and
   displaying additional information on the display associated with the first electronic device, wherein the displayed additional information comprises information relating to the second region.

24. The computer implemented method of claim 19, further comprising displaying on the display associated with the first electronic device at least one of:
   information relating to a location of the second region of the environment;
   a local environmental characteristic level of the second region of the environment; and
   a route direction from a current location of the first electronic device to the location of the second region of the environment.

25. The computer implemented method of claim 19, further comprising:
   receiving, from a second electronic device, the first environmental characteristic preference level before determining that the environmental characteristic level is greater than the first environmental characteristic preference level.

26. The computer implemented method of claim 25, wherein the route direction comprises areas of the environment that have sound levels the same or higher than the first end user's current sound level.

27. The computer implemented method of claim 19, wherein the environmental characteristic is a gas composition.

* * * * *